US012657269B2

(12) United States Patent (10) Patent No.: US 12,657,269 B2

Hall et al. (45) Date of Patent: Jun. 16, 2026

(54) USING CONTINUOUS BIOMETRIC INFORMATION MONITORING FOR SECURITY

(71) Applicant: Dexcom, Inc., San Diego, CA (US)

(72) Inventors: Thomas Hall, San Diego, CA (US); Andrew Attila Pal, San Diego, CA (US); Matthew Lawrence Johnson, San Diego, CA (US); Issa S Salameh, San Diego, CA (US); Christopher Efigenio, San Diego, CA (US); Michael Tyler, San Diego, CA (US)

(73) Assignee: Dexcom, Inc., San Diego, CA (US)

( * ) Notice: Subject to any disclaimer, the term of this patent is extended or adjusted under 35 U.S.C. 154(b) by 497 days.

(21) Appl. No.: 17/742,064

(22) Filed: May 11, 2022

(65) Prior Publication Data

US 2022/0366027 A1 Nov. 17, 2022

Related U.S. Application Data

(60) Provisional application No. 63/189,418, filed on May 17, 2021.

(51) Int. Cl.
H04L 9/00 (2022.01)
G06F 21/32 (2013.01)
(Continued)

(52) U.S. Cl.
CPC .............. G06F 21/32 (2013.01); G06F 21/35 (2013.01); H04L 9/0643 (2013.01);
(Continued)

(58) Field of Classification Search
CPC .. G06F 21/32; G06F 21/35; G06F 2221/2137; G06F 2221/2139;
(Continued)

(56) References Cited

U.S. PATENT DOCUMENTS 9,923,927 B1 * 3/2018 McClintock ........ H04L 63/0846
2015/0035643 A1 2/2015 Kursun
(Continued)

FOREIGN PATENT DOCUMENTS

JP 2019154573 A * 9/2019

OTHER PUBLICATIONS

International Search Report and Written Opinion for Application No. PCT/US2022/028785, mailed Oct. 25, 2022, 23 pages.
(Continued)

*Primary Examiner* — Syed M Ahsan
(74) *Attorney, Agent, or Firm* — Klarquist Sparkman, LLP

(57) ABSTRACT

Measurements of biometric information of a user are obtained over time, such as blood glucose measurements. These biometric measurements are typically obtained by a wearable biometric information monitoring device being worn by the user. These biometric measurements are used by various different systems, such as a computing device of the user or a biometric information monitoring platform that receives biometric measurements from multiple different users. The biometric measurements are used for various security aspects, such as one or more of part of multi-factor authentication of the user, generating security keys (e.g., connection keys, encryption keys), identifying biometric measurements associated with different user identifiers but the same use, and protecting biometric measurements so as to be retrievable only by a recipient associated with an additional computing device, and so forth.

4 Claims, 17 Drawing Sheets

(51) Int. Cl.
  *G06F 21/35*     (2013.01)
  *H04L 9/06*      (2006.01)
  *H04L 9/08*      (2006.01)
(52) U.S. Cl.
  CPC .... *H04L 9/0866* (2013.01); *G06F 2221/2137* (2013.01); *G06F 2221/2139* (2013.01)
(58) Field of Classification Search
  CPC ................. H04L 9/0643; H04L 9/0866; H04L 2463/082; H04L 63/0861; A61B 5/14532; H04W 12/065; H04W 12/33
  See application file for complete search history.

(56) References Cited

U.S. PATENT DOCUMENTS

| | | | | |
|---|---|---|---|---|
| 2015/0317855 A1* | 11/2015 | Sezan | ...................... | G06F 21/35 |
| | | | | 340/5.52 |
| 2016/0287142 A1* | 10/2016 | Han | ...................... | A61B 5/6804 |
| 2017/0230360 A1* | 8/2017 | Mosenia | ................ | G16H 40/67 |
| 2019/0209777 A1 | 7/2019 | O'Connell et al. | | |
| 2019/0339224 A1 | 11/2019 | Bhavaraju et al. | | |

OTHER PUBLICATIONS

Invitation to Pay Additional Fees and Where Applicable Protest Fee and Partial International Search for Application No. PCT/US2022/028785, mailed Sep. 1, 2022, 16 pages.

* cited by examiner

500

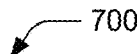
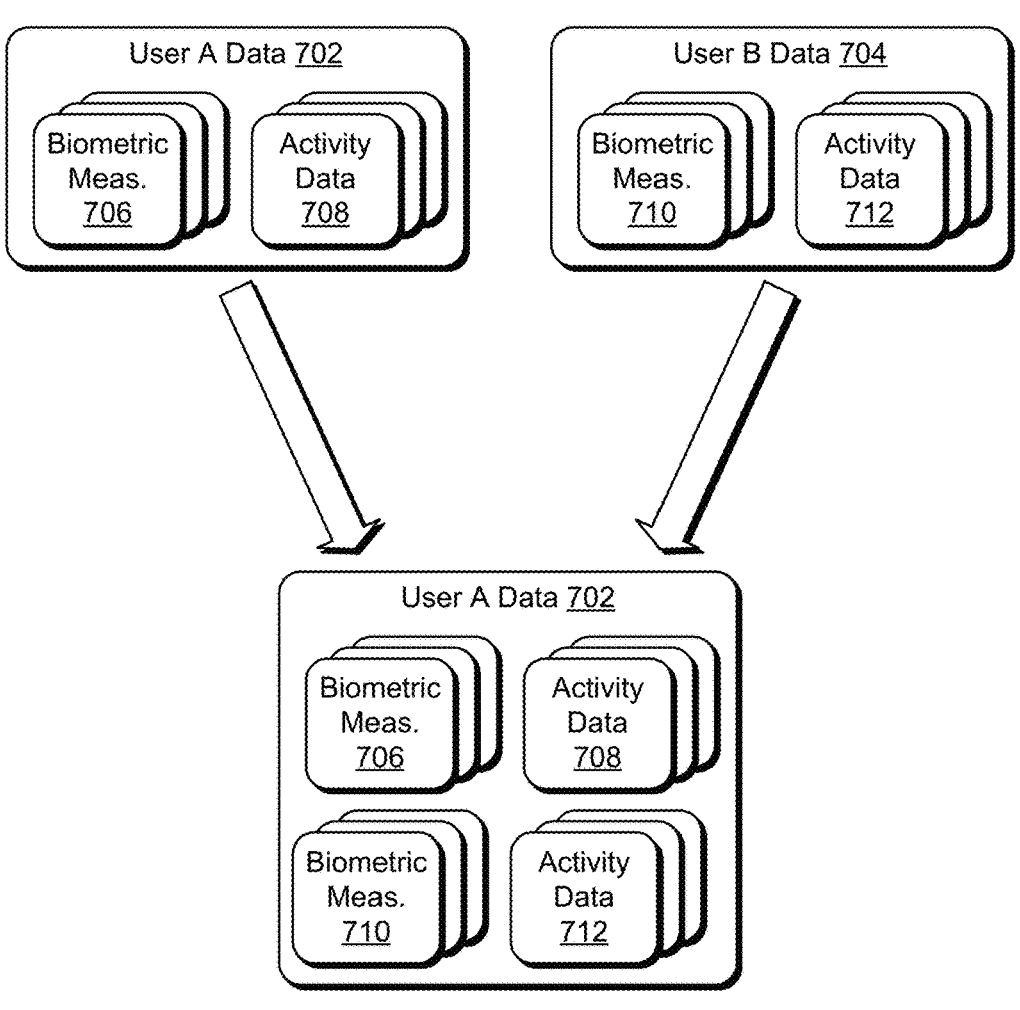
Fig. 7

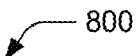
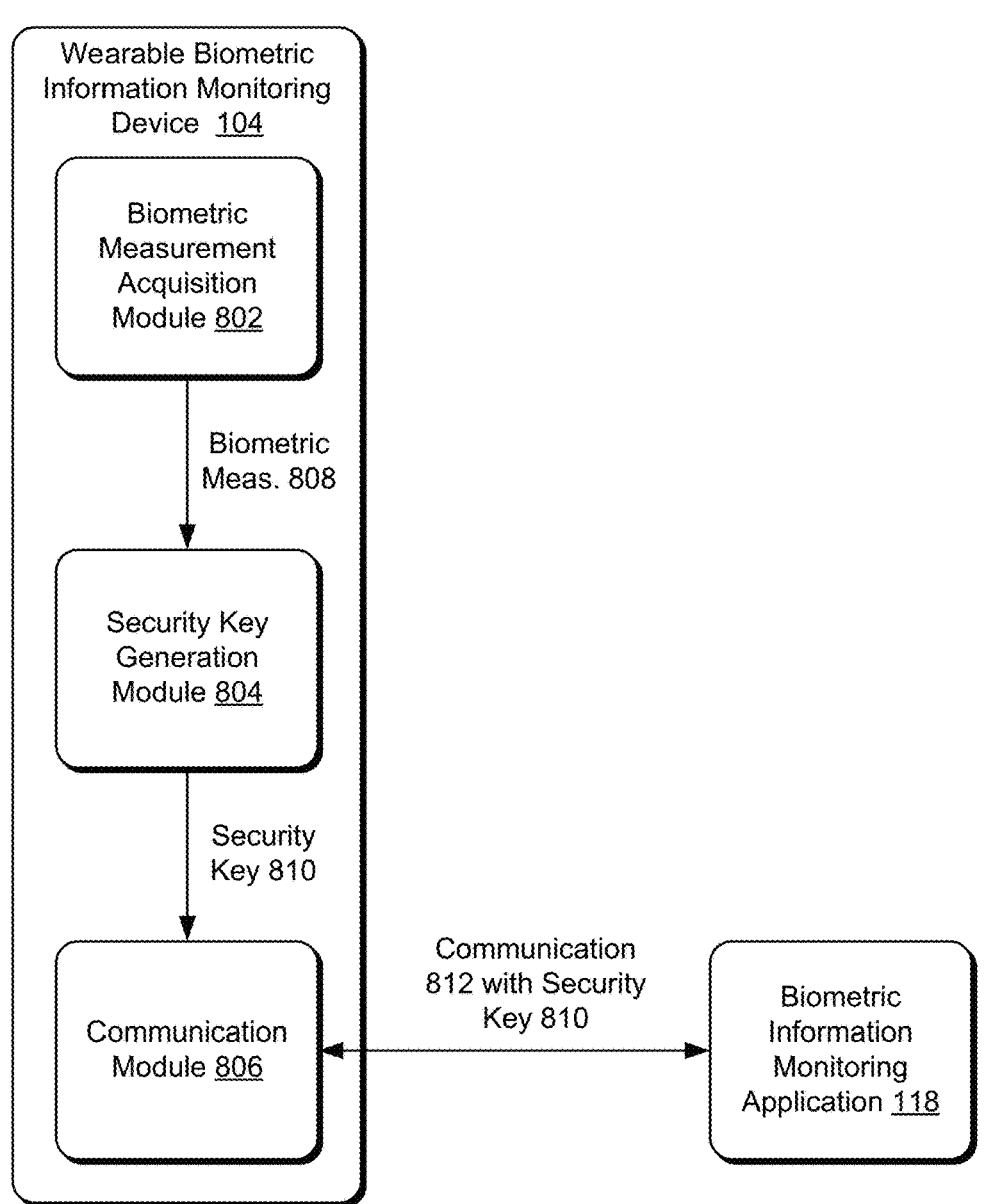
Fig. 8

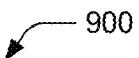
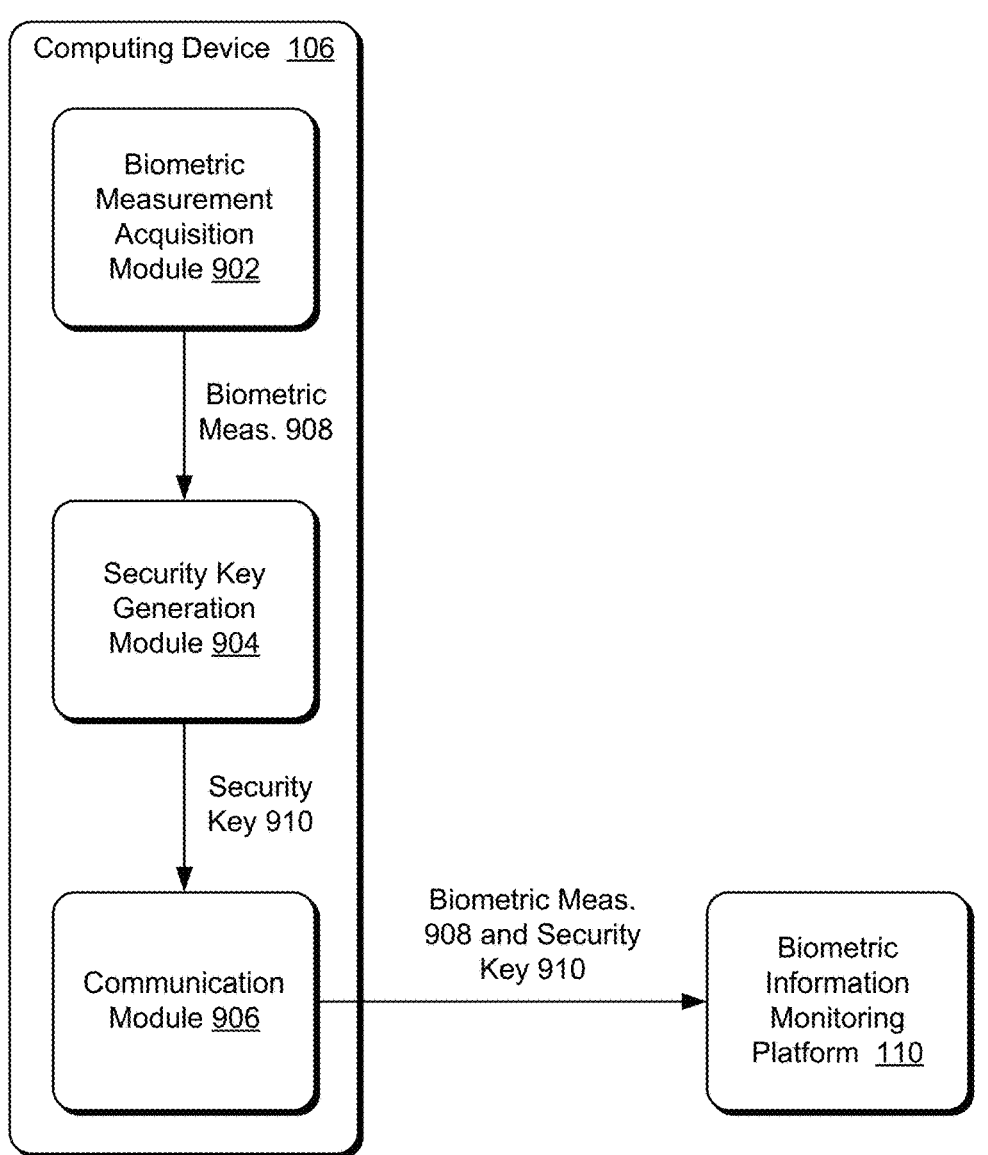
Fig. 9

1000

Biometric
Measurement
Receiving Module
1002

Biometric
Meas.
1012

Protection Module
1004

Protected
Biometric
Meas.
1014

Biometric
Measurement
Management
Module 1006

Verification
Request 1016

Recipient
Computing device
1008

Set of Computing
Devices 1010

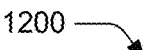

1200 ⟶

```
┌─────────────────────────────────────────────────────────┐
│                         1202                            │
│ Receive continuously, from a computing device, individual│
│  biometric measurements of a user of the computing device│
└─────────────────────────────────────────────────────────┘
                          │
                          ▼
┌─────────────────────────────────────────────────────────┐
│                         1204                            │
│ Associate the received biometric measurements with an    │
│                identifier of the user                    │
└─────────────────────────────────────────────────────────┘
                          │
                          ▼
┌─────────────────────────────────────────────────────────┐
│                         1206                            │
│ Receive a user verification request including a biometric│
│            measurement specified by the user             │
└─────────────────────────────────────────────────────────┘
                          │
                          ▼
┌─────────────────────────────────────────────────────────┐
│                         1208                            │
│ Check whether the biometric measurement specified by the │
│    user matches the received biometric measurements      │
└─────────────────────────────────────────────────────────┘
      │                                            │
   Matches                                    Does not
      │                                         match
      ▼                                            ▼
┌──────────────────────┐              ┌──────────────────────┐
│        1210          │              │        1212          │
│ Return user          │              │ Return user          │
│ verification result  │              │ verification result  │
│ indicating the user  │              │ indicating the user  │
│ is verified          │              │ is not verified      │
└──────────────────────┘              └──────────────────────┘
```

Figure 13:
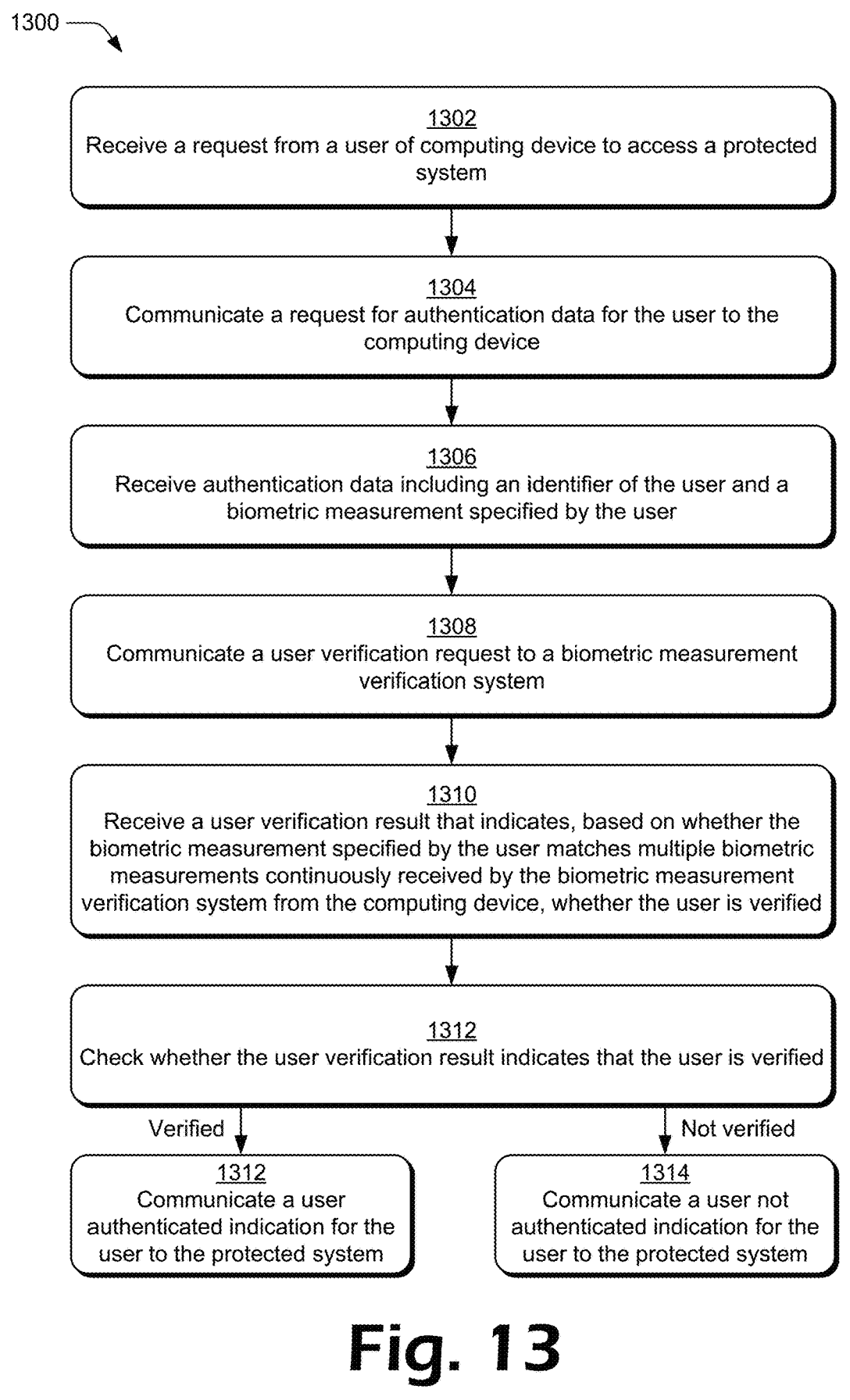

```
┌─────────────────────────────────────────────────────┐
│                        1302                          │
│   Receive a request from a user of computing device  │
│          to access a protected system                │
└─────────────────────────────────────────────────────┘
                          │
                          ▼
┌─────────────────────────────────────────────────────┐
│                        1304                          │
│   Communicate a request for authentication data for  │
│          the user to the computing device            │
└─────────────────────────────────────────────────────┘
                          │
                          ▼
┌─────────────────────────────────────────────────────┐
│                        1306                          │
│  Receive authentication data including an identifier │
│  of the user and a biometric measurement specified   │
│                    by the user                       │
└─────────────────────────────────────────────────────┘
                          │
                          ▼
┌─────────────────────────────────────────────────────┐
│                        1308                          │
│   Communicate a user verification request to a       │
│     biometric measurement verification system        │
└─────────────────────────────────────────────────────┘
                          │
                          ▼
┌─────────────────────────────────────────────────────┐
│                        1310                          │
│  Receive a user verification result that indicates,  │
│  based on whether the biometric measurement          │
│  specified by the user matches multiple biometric    │
│  measurements continuously received by the biometric │
│  measurement verification system from the computing  │
│         device, whether the user is verified         │
└─────────────────────────────────────────────────────┘
                          │
                          ▼
┌─────────────────────────────────────────────────────┐
│                        1312                          │
│  Check whether the user verification result          │
│  indicates that the user is verified                 │
└─────────────────────────────────────────────────────┘
         │                                    │
   Verified │                      Not verified │
         ▼                                    ▼
┌────────────────────┐          ┌────────────────────┐
│        1312        │          │        1314        │
│ Communicate a user │          │ Communicate a user │
│  authenticated     │          │  not authenticated │
│ indication for the │          │ indication for the │
│ user to the        │          │ user to the        │
│ protected system   │          │ protected system   │
└────────────────────┘          └────────────────────┘
```

Figure 14:
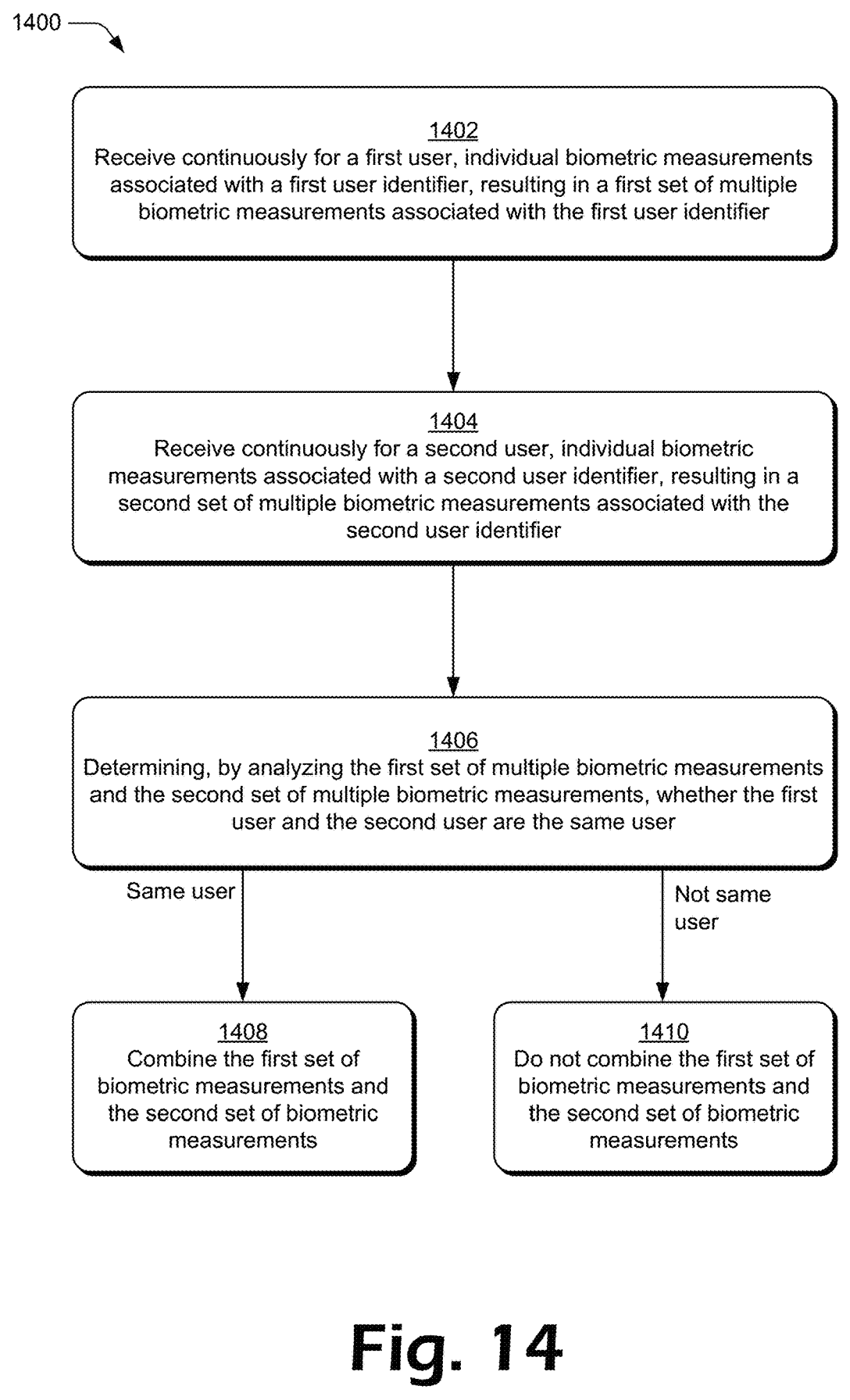

1402
Receive continuously for a first user, individual biometric measurements associated with a first user identifier, resulting in a first set of multiple biometric measurements associated with the first user identifier 1404
Receive continuously for a second user, individual biometric measurements associated with a second user identifier, resulting in a second set of multiple biometric measurements associated with the second user identifier 1406
Determining, by analyzing the first set of multiple biometric measurements and the second set of multiple biometric measurements, whether the first user and the second user are the same user Same user                                              Not same user 1408
Combine the first set of biometric measurements and the second set of biometric measurements 1410
Do not combine the first set of biometric measurements and the second set of biometric measurements

1502
Continuously acquire individual biometric measurements of a user of a wearable biometric information monitoring device worn by the user

1504
Generate a security key by applying one or more functions based on the biometric measurements

1506
Use the security key in communicating the biometric measurements to an additional device

1600 —

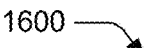

1602
Continuously acquire individual biometric measurements of a user of a computing device resulting in a set of biometric measurements

1604
One or more biometric measurements of the set of biometric measurements are protected so as to be retrievable only by a recipient associated with an additional computing device

1606
The protected biometric measurements are communicated to a set of computing devices to verify the protected biometric measurements for use by the additional computing device

1608
The second computing device is allowed to use the protected biometric measurements in response to the set of computing devices verifying the protected biometric measurements for use by the additional computing device

USING CONTINUOUS BIOMETRIC INFORMATION MONITORING FOR SECURITY

RELATED APPLICATION

This application claims the benefit of U.S. Provisional Patent Application No. 63/189,418, filed May 17, 2021, and titled "Using Continuous Biometric Information Monitoring For Security," the entire disclosure of which is hereby incorporated by reference.

BACKGROUND

As technology has advanced, computers have become commonplace in numerous aspects of our daily lives and the functions these computers perform for us have been continually expanding. One such use is the monitoring of various biometric information. For example, fitness trackers may monitor our heart rates, smartwatches may monitor our blood oxygen levels, and glucose monitoring systems may monitor our glucose levels. These computers typically have conventional monitoring applications that display these heart rates, blood oxygen levels, or glucose levels to us.

While these conventional monitoring applications are helpful in that they display these monitored values to us, they are not without their problems. One such problem is that oftentimes these conventional monitoring applications are limited to simply displaying the monitored values. By failing to use these monitored values to perform additional functions, these conventional monitoring applications provide limited value to users, leaving users dissatisfied with their computers and monitoring applications.

SUMMARY

To overcome these problems, techniques for using continuous biometric information monitoring are discussed. In one or more implementations, individual biometric measurements of a user of a computing device are continuously received from the computing device, resulting in a set of multiple biometric measurements of the user. These multiple biometric measurements are associated with an identifier of the user. A user verification request is received from an access control system, the request including a biometric measurement specified by the user and an identifier of the user. A check is made as to whether the biometric measurement specified by the user matches the multiple biometric measurements received from the computing device and a user verification result is returned to the access control system. The user verification result indicates the user is verified in response to the biometric measurement specified by the user matching the most recently received biometric measurement, and indicates the user is not verified in response to the biometric measurement specified by the user not matching the most recently received biometric measurement.

In one or more implementations, individual biometric measurements associated with a first user identifier are received continuously from one or more computing devices for a first user, resulting in a first set of multiple biometric measurements associated with the first user identifier. Individual biometric measurements associated with a second user identifier are also received continuously from the one or more computing devices for a second user, resulting in a second set of multiple biometric measurements associated with the second user identifier. A determination is made, by analyzing the first set of multiple biometric measurements and the second set of multiple biometric measurements, that the first user and the second user are the same user, and in response to this determination the first set of biometric measurements and the second set of biometric measurements are combined.

In one or more implementations, individual biometric measurements of a user of a wearable biometric information monitoring device worn by the user are continuously acquired. A security key is generated by applying one or more functions based on one of the biometric measurements, the one or more functions including a hash function. The security key is used in communicating the biometric measurements to an additional device.

In one or more implementations, individual glucose measurements of a user of a first computing device are received, resulting in a set of multiple glucose measurements of the user. A glucose measurement of the set of glucose measurements is protected so as to be retrievable only by a recipient associated with a second computing device. The protected glucose measurement is communicated to a set of computing devices to verify the protected glucose measurement for use by the second computing device, and the second computing device is allowed to use the protected glucose measurement in response to the set of computing devices verifying the protected glucose measurement for use by the second computing device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 7 illustrates an example of combining user data associated with two user identifiers.

FIG. 8 is an illustration of another example of operation of the techniques described herein.

FIG. 9 is an illustration of another example of operation of the techniques described herein.

FIG. 12 depicts a procedure in an example implementation in which continuously monitored biometric information is used to verify a user.

FIG. 13 depicts a procedure in another example implementation in which continuously monitored biometric information is used to verify a user.

FIG. 14 depicts a procedure in an example implementation in which user data associated with two user identifiers is combined and associated with a single user identifier.

FIG. 16 depicts a procedure in an example implementation in which protected biometric measurements are verified for use by another computing device.

DETAILED DESCRIPTION

Overview

Figure 1:
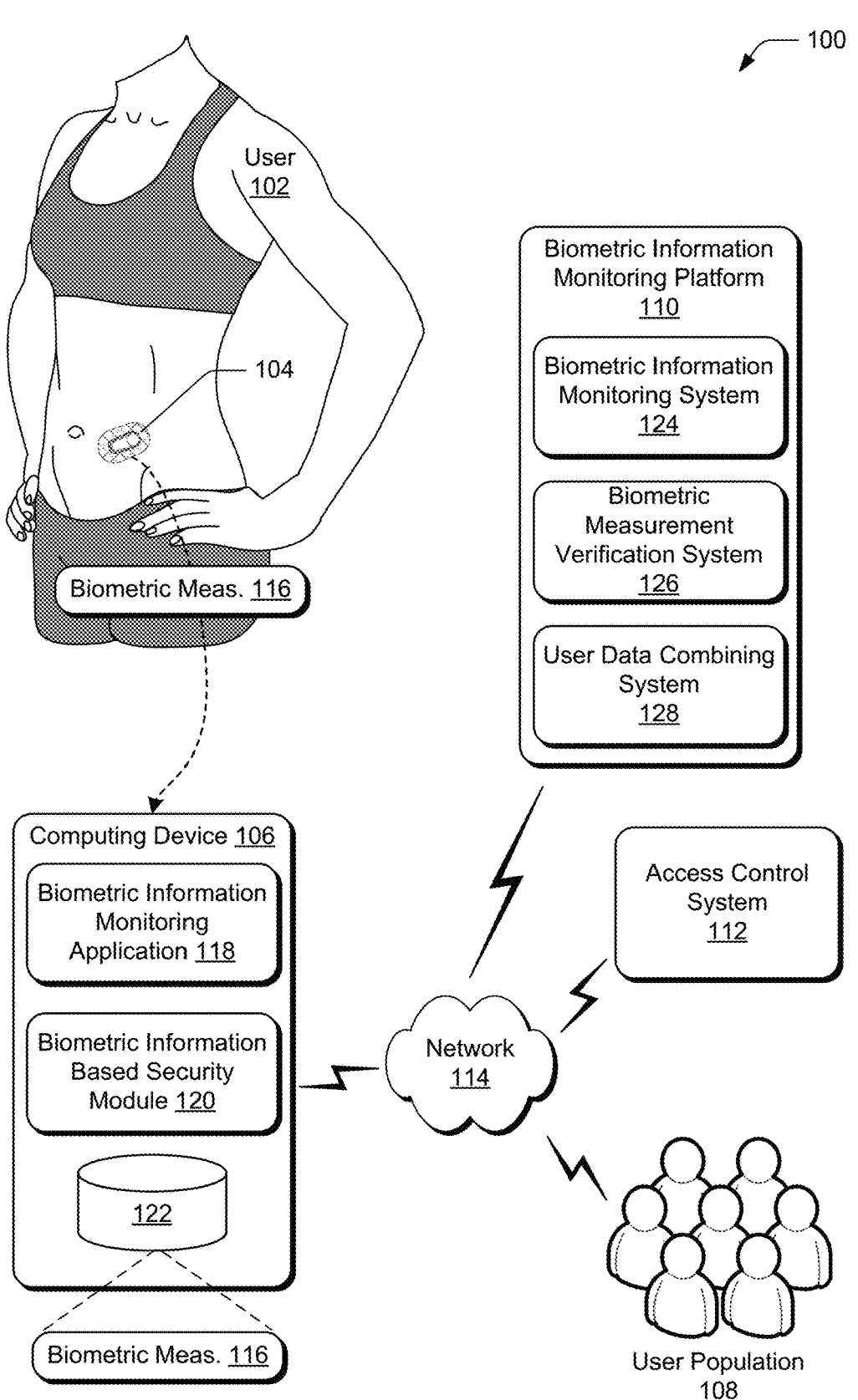
FIG. 1 is an illustration of an environment in an example implementation that is operable to employ using continuous biometric information monitoring for security as described herein.

Techniques for using continuous biometric information monitoring for security are discussed herein. Broadly, measurements of biometric information of a user are obtained over time, such as blood glucose measurements. These biometric measurements are typically obtained by a wearable biometric information monitoring device being worn by the user. These biometric measurements are used by various different systems, such as a computing device of the user or a biometric information monitoring platform that receives biometric measurements from multiple different users. The biometric measurements can be produced substantially continuously, such that the device may be configured to produce the biometric measurements at regular or irregular intervals of time (e.g., approximately every hour, approximately every 30 minutes, approximately every 5 minutes, and so forth), responsive to establishing a communicative coupling with a different device (e.g., when a computing device establishes a wireless connection with a wearable biometric information monitoring device to retrieve one or more of the measurements), and so forth.

In one or more implementations, continuous biometric information monitoring is used as part of multi-factor authentication. Multi-factor authentication typically involves at least two factors including something known to the user (e.g., a password) and something physical that the user has (e.g., a key fob). Using the techniques discussed herein, the something physical that the user has can be various biometric measurements, such as blood glucose measurements, heart rate measurements, blood pressure measurements, blood oxygen level measurements, and so forth. A computing device of the user continuously collects biometric measurements over time and provides the biometric measurements to a biometric information monitoring platform. The biometric information monitoring platform maintains the biometric measurements for subsequent use by the user or others the user shares with (e.g., medical professionals).

When authentication of the user is subsequently requested by an access control system, one aspect of the authentication is based on the biometric information. The user is prompted on his or her computing device to provide a biometric measurement, such as a current glucose measurement of the user, which is communicated to the access control system. The access control system requests verification of the user from a biometric measurement verification system of the biometric information monitoring platform by sending the user-specified biometric measurement to the biometric measurement verification system. The biometric measurement verification system compares the user-specified biometric measurement to the continuously collected biometric measurements received from the computing device of the user and determines whether the user-specified biometric measurement matches the continuously collected biometric measurements. Whether the biometric measurement specified by the user matches the continuously collected biometric measurements can be determined in any of a variety of manners, such as the biometric measurement specified by the user being an exact match to the most recently received biometric measurement of the continuously collected biometric measurements, the biometric measurement specified by the user being within a predicted range of biometric measurements, and so forth.

If the user-specified biometric measurement matches the continuously collected biometric measurements, then a user verification result indicating the user is verified is returned to the access control system. However, if the user-specified biometric measurement does not match the continuously collected biometric measurements, then a user verification result indicating the user is not verified is returned to the access control system. The access control system can then proceed accordingly to authenticate the user or not authenticate the user based on the user verification result.

Using the biometric measurements as the something physical that the user has when authenticating the user provides an accurate way to authenticate the user without the user needing to carry any additional physical items. For example, the user is already wearing the wearable biometric information monitoring device regularly so there will be no risk of failed authentication due to the user forgetting to take the wearable biometric information monitoring device with him or her when leaving their home or office.

Additionally or alternatively, continuous biometric information monitoring is used to combine data associated with different user identifiers. In some scenarios, users establish a user account, associated with a user identifier, on a biometric information monitoring platform. The biometric measurements obtained for the user are provided to the biometric information monitoring platform for any of a variety of purposes, such as health analysis of the user, communication to health care providers, user verification, and so forth. Situations arise, however, where users are associated with multiple different user identifiers on the biometric information monitoring platform, such as because they forgot the user identifier or password for a user account they already created or because they forgot they created the user account.

The biometric information monitoring platform maintains biometric measurements for the user associated with the user identifier that the user is logged in with at the time the biometric measurements are received. The biometric information monitoring platform analyzes the biometric measurements associated with two different user identifiers to determine whether the biometric measurements indicate that they are from the same user. The biometric information monitoring platform optionally receives and maintains, associated with each user identifier, additional activity data regarding the user or the user's device, such as geolocation, activity, sleep/wake cycle, daily movement patterns, number of applications on the user's device, general categorical spread of applications on the user's device, general usage pattern of one or more applications on the user's device, and so forth. If the biometric measurements and optionally the collected data for two different user identifiers are similar enough that they indicate the two user identifiers are associated with the same user, the biometric measurements and optionally passively collected activity data associated with the two user identifiers are combined and associated with a single user identifier.

Combining and associating the biometric measurements and optionally passively collected activity data from two user identifiers with a single user identifier allows the biometric information monitoring platform to maintain more data as associated with the user, providing more accurate biometric information for the user. For example, situations in which data for a single user is spread across multiple user identifiers results in gaps in biometric measurements because each of the multiple user identifiers has associated with it only a portion of the biometric measurements for the user. The techniques discussed herein avoid the occurrence of such situations.

Additionally or alternatively, continuous biometric information monitoring is used to generate security keys that can be used in various manners. Individual biometric measurements of a user of a wearable biometric information device worn by the user are continuously acquired. This continuously acquiring can refer to, for example, a wearable biometric information monitoring device continuously generating the individual biometric measurements or a computing device continuously receiving the individual biometric measurements from the wearable biometric information monitoring device. A security key is generated by applying one or more functions based on the biometric measurements, including a hash function. The security key can be generated from a single individual biometric measurement or multiple ones of the individual biometric measurements. The security key is used in communicating the biometric measurements to an additional device, e.g., using the security key as a connection key to identify a connection between the wearable biometric information device and a computing device of the user or using the security key as a certification value of the biometric measurements to allow a biometric information monitoring platform to validate or verify the biometric measurements.

These techniques for generating a security key improve the effectiveness of the security key because the biometric measurements for different users vary differently over time, making it difficult for malicious users or devices to know what those biometric measurements are in an attempt to duplicate the security key.

Additionally or alternatively, continuously monitored biometric measurements are protected so as to be retrievable only by a recipient associated with an additional computing device. The biometric measurement is protected, for example, by encrypting the biometric measurement with a public key of a public/private key pair associated with an intended recipient of the biometric measurement. The protected biometric measurement is communicated to a set of computing devices to verify the protected biometric measurement for use by the additional computing device. This communication includes, for example, a request for the set of computing devices to approve adding a block describing the protected biometric measurement and the recipient to a blockchain. In response to the set of computing devices verifying the protected biometric measurement for use by the additional computing device, the additional computing device is allowed to use the protected biometric measurement.

These techniques for protecting and verifying biometric measurements allows those biometric measurements to be communicated to, and used by, another computing device while preventing other computing devices from using the biometric measurements. For example, a user can communicate his or her biometric measurements to one entity (e.g., a healthcare provider or research organization) but prevent other entities from using the biometric measurements.

Example of an Environment

FIG. 1 is an illustration of an environment 100 in an example implementation that is operable to employ using continuous biometric information monitoring for security as described herein. The environment 100 includes user 102, who is depicted wearing a wearable biometric information monitoring device 104 that is illustrated as a wearable glucose monitoring device. The environment 100 also includes computing device 106, other users in a user population 108 that wear biometric information monitoring devices 104, biometric information monitoring platform 110, and access control system 112. The wearable biometric information monitoring device 104, computing device 106, user population 108, glucose monitoring platform 110, and access control system 112 are communicatively coupled, including via a network 114.

Additionally or alternatively, the wearable biometric information monitoring device 104 and the computing device 106 may be communicatively coupled in other ways, such as using one or more wireless communication protocols or techniques. By way of example, the wearable biometric information monitoring device 104 and the computing device 106 may communicate with one another using one or more of Bluetooth (e.g., Bluetooth Low Energy links), near-field communication (NFC), 5G, and so forth.

Although the wearable biometric information monitoring device 104 is illustrated as a wearable glucose monitoring device, the wearable biometric information monitoring device 104 may monitor biometric information other than or in addition to glucose information. For example, the biometric information monitoring device 104 may monitor biometric information including user 102's heart rate and generate heart rate measurements, may monitor biometric information including user 102's blood pressure and generate blood pressure measurements, may monitor biometric information including user 102's blood oxygen level and generate blood oxygen level measurements, may monitor biometric information including electrical signals from user 102's heart and generate electrocardiogram (ECG or EKG) measurements, may monitor biometric information including user 102's rate of blood flow and generate blood flow measurements, may monitor biometric information including user 102's breathing rate and generate breathing rate measurements, and so forth.

In accordance with the described techniques, the wearable biometric information monitoring device 104 is configured to provide measurements of user 102's biometric information. Although a wearable biometric information monitoring device is discussed herein, it is to be appreciated that the techniques discussed herein may be applied in connection with other devices capable of providing biometric information measurements, e.g., non-wearable devices such as blood glucose meters requiring finger sticks, patches, other wearable devices such as smart watches or smart rings, and so forth. In implementations that involve the wearable biometric information monitoring device 104, though, it may be configured with a biometric information sensor that continuously detects biometric information and enables generation of measurements, such as continuously detecting analytes indicative of the user 102's glucose and enabling generation of glucose values or measurements. In the illustrated environment 100 and throughout the detailed description these measurements are represented as biometric measurements 116.

In one or more implementations, the wearable biometric information monitoring device 104 is a continuous biometric information monitoring system. As used herein, the term "continuous" used in connection with biometric measurement monitoring may refer to an ability of a device to produce measurements substantially continuously, such that the device may be configured to produce the biometric measurements 116 at regular or irregular intervals of time (e.g., every hour, every 30 minutes, every 5 minutes, and so forth), responsive to establishing a communicative coupling with a different device (e.g., when a computing device establishes a wireless connection with the wearable biometric information monitoring device 104 to retrieve one or more of the measurements), and so forth.

Additionally, the wearable biometric information monitoring device 104 transmits the biometric measurements 116 to the computing device 106, such as via a wireless connection. The wearable biometric information monitoring device 104 may communicate these measurements in real-time, e.g., as they are produced using a glucose sensor, heart rate sensor, blood oxygen level sensor, and so forth. Additionally or alternatively, the wearable biometric information monitoring device 104 may communicate the biometric measurements 116 to the computing device 106 at set time intervals. For example, the wearable biometric information monitoring device 104 may be configured to communicate the biometric measurements 116 to the computing device 106 every five minutes (as they are being produced).

Certainly, an interval at which the biometric measurements 116 are communicated may be different from the examples above without departing from the spirit or scope of the described techniques. The measurements may be communicated by the wearable biometric information monitoring device 104 to the computing device 106 according to other bases in accordance with the described techniques, such as based on a request from the computing device 106. Regardless, the computing device 106 may maintain the biometric measurements 116 of the user 102 at least temporarily, e.g., in computer-readable storage media of the computing device 106.

The computing device 106 may be configured in a variety of ways without departing from the spirit or scope of the described techniques, for example as a mobile phone, other type of mobile device (e.g., a wearable device or tablet device). In one or more implementations, the computing device 106 may be configured as a dedicated device associated with the biometric information monitoring platform 110, e.g., with functionality to obtain the biometric measurements 116 from the wearable biometric information monitoring device 104, perform various computations in relation to the biometric measurements 116, display information related to the biometric measurements 116 and the biometric information monitoring platform 110, communicate the biometric measurements 116 to the biometric information monitoring platform 110, and so forth.

Additionally, the computing device 106 may be representative of more than one device in accordance with the described techniques. In one or more scenarios, for instance, the computing device 106 may correspond to both a wearable device (e.g., a smart watch) and a mobile phone. In such scenarios, both of these devices may be capable of performing at least some of the same operations, such as to receive the biometric measurements 116 from the wearable biometric information monitoring device 104, communicate them via the network 114 to the biometric information monitoring platform 110, display information related to the biometric measurements 116, and so forth. Additionally or alternatively, different devices may have different capabilities that other devices do not have or that are limited through computing instructions to specified devices.

In the scenario where the computing device 106 corresponds to a separate smart watch and a mobile phone, for instance, the smart watch may be configured with various sensors and functionality to measure a variety of biometric information as discussed above and activities (e.g., steps or other exercise) of the user 102. In this scenario, the mobile phone may not be configured with these sensors and functionality, or it may include a limited amount of that functionality—although in other scenarios a mobile phone may be able to provide the same functionality. Continuing with this particular scenario, the mobile phone may have capabilities that the smart watch does not have, such as a camera to capture images associated with biometric information monitoring and an amount of computing resources (e.g., battery and processing speed) that enables the mobile phone to more efficiently carry out computations in relation to the biometric measurements 116. Even in scenarios where a smart watch is capable of carrying out such computations, computing instructions may limit performance of those computations to the mobile phone so as not to burden both devices and to utilize available resources efficiently. To this extent, the computing device 106 may be configured in different ways and represent different numbers of devices than discussed herein without departing from the spirit and scope of the described techniques.

In accordance with the discussed techniques, the computing device 106 is configured to implement techniques for using continuous biometric information monitoring for security. In the environment 100, the computing device 106 includes biometric information monitoring application 118, biometric information based security module 120, and storage device 122. Broadly speaking, the biometric information monitoring application 118 manages receipt of the biometric measurements 116 from biometric information monitoring device 104, communication of biometric measurements 116 to biometric information monitoring platform 110, display or other presentation of a user interface including biometric measurements 116, and so forth. The biometric information monitoring application 118 may be configured to support interactions with a user that enable insights about the user's biometric measurements to be presented, for example, causing alerts to be output, causing information to be communicated to a health care provider, causing information to be communicated to the biometric information monitoring platform 110, and so forth. Further, the biometric measurements 116 are shown stored in the storage device 122. The storage device 122 may represent one or more databases and also other types of storage capable of storing the biometric measurements 116.

In one or more implementations, the biometric measurements 116 may be stored at least partially remote from the computing device 106, e.g., in storage of the biometric information monitoring platform 110, and retrieved or otherwise accessed in connection with configuring and outputting (e.g., displaying) user interfaces at the computing device 106. For instance, the biometric measurements 116 may be generally stored in storage of the biometric information monitoring platform 110 along with the biometric measurements of the user population 108, and some of that data may be retrieved or otherwise accessed on an as-needed basis to display user interfaces at the computing device 106.

Broadly speaking, the biometric information based security module 120 may coordinate access to a system to which access control system 112 gates or controls access. This access is based on biometric information based security module 120 prompting user 102 to manually provide a biometric measurement (e.g., the current or most recent biometric measurement 116 as displayed by biometric information monitoring application 118), also referred to as a user-specified biometric measurement. The biometric information based security module 120 provides the user-specified biometric measurement to access control system 112, which authenticates or does not authentication the user 102 based on the user-specified biometric measurement. Additionally or alternatively the biometric information based security module 120 implements other functionality, such as generation of a security key, protection (e.g., encryption) of one or more biometric measurements 116, and so forth.

In one or more implementations, the user-specified biometric measurement is one factor in a multi-factor (e.g., two-factor) authentication technique. Multi-factor authentication typically involves at least two factors, one of which is something known to the user (e.g., a password) and the other of which is something physical that the user has (e.g., a phone, key fob, a fingerprint). Using the techniques discussed herein, the something physical that the user has is any of various biometric information, such as glucose measurements, heart rate measurements, blood pressure measurements, blood oxygen level measurements, and so forth.

The biometric information monitoring platform 110 includes a biometric information monitoring system 124, a biometric measurement verification system 126, and a user data combining system 128. Broadly speaking, the biometric information monitoring system 124 stores biometric measurements 116 for the user 102 as well as the user population 108. The biometric information monitoring system 124 may also perform various evaluation or analysis of the stored biometric measurements 116, such as estimating biometric measurements for user 102 or user population 108. Broadly speaking, the biometric measurement verification system 126 verifies whether a biometric measurement specified by the user 102 is actually from the user 102 by determining whether the biometric measurement specified by the user 102 matches the most recently received biometric measurement from the user 102 or an estimated biometric measurement. Broadly speaking, the user data combining system 128 analyzes biometric measurements associated with different user identifiers, automatically identifies multiple user identifiers that are associated with the same user, and merges the combines the biometric measurements associated with those user identifiers so as to be associated with a single user identifier.

Broadly speaking, the access control system 112 gates or controls access to a system, which may store data, perform transactions, allow physical access to a location (e.g., unlock doors or disable security alarms), and so forth based on user 102 being authenticated. User 102 is authenticated by the access control system 112 based on the biometric measurements 116, including whether the biometric measurement verification system 126 verifies that a biometric measurement that the user 102 manually specifies is actually from the user 102. The computing device 106 is communicatively coupled to the access control system 112 in any of various manners, such as using one or more wireless communication protocols or techniques (e.g., network 114, Bluetooth, NFC, 5G, and so forth.

Although illustrated as including the biometric measurement verification system 126 and user data combining system 128, additionally or alternatively the biometric information monitoring platform 110 does not include one or both of the biometric measurement verification system 126 and the user data combining system 128. Similarly, although environment 100 is illustrated as including access control system 112, additionally or alternatively the environment 100 does not include the access control system 112.

Figure 2:
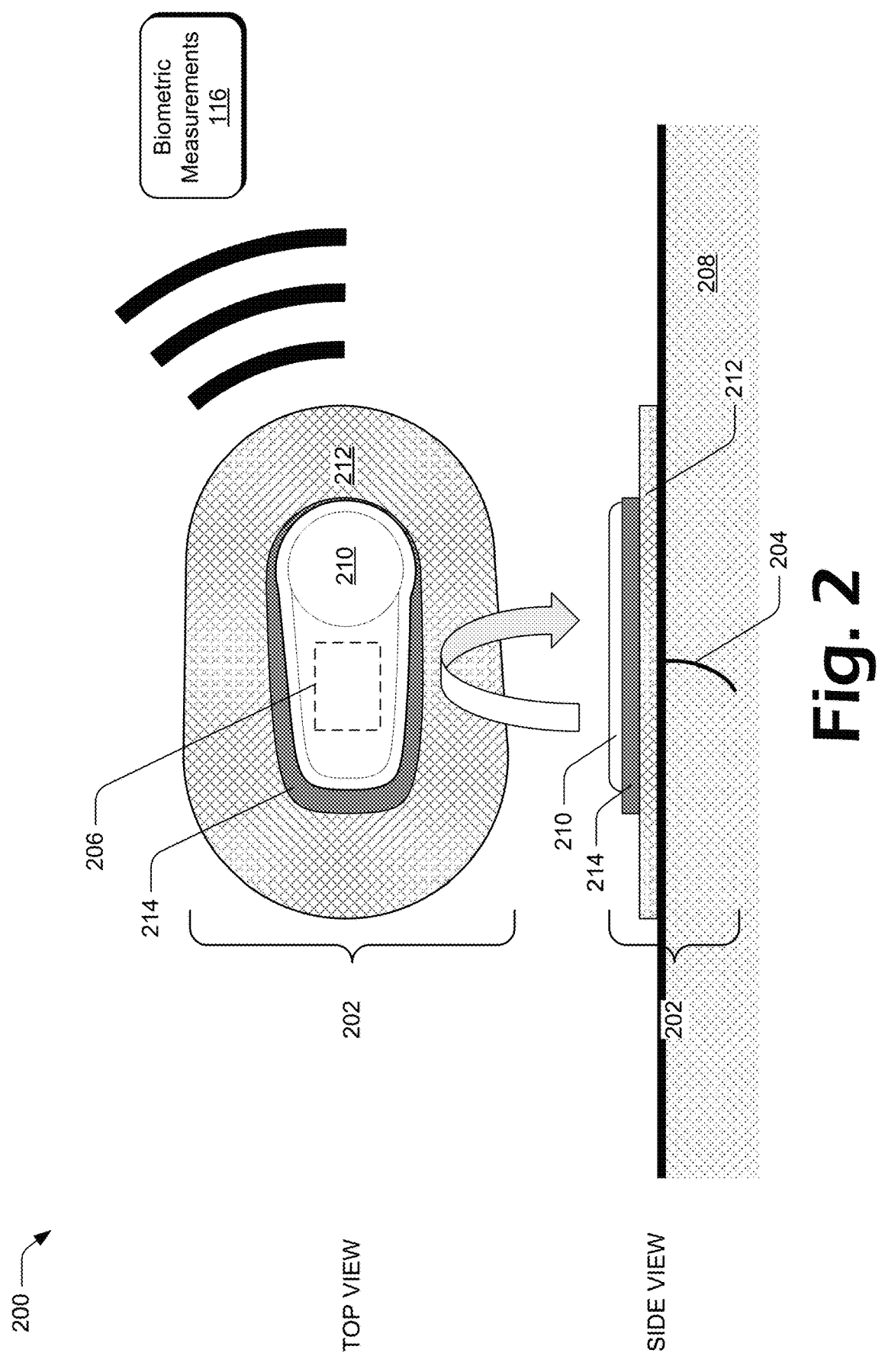
FIG. 2 depicts an example of an implementation of a wearable biometric information monitoring device in greater detail.

FIG. 2 depicts an example 200 of an implementation of wearable biometric information monitoring device 104 of FIG. 1 in greater detail. In the example of FIG. 2, the wearable biometric information monitoring device 104 is a wearable glucose monitoring device 202. The illustrated example 200 includes a top view and a corresponding side view of the wearable glucose monitoring device 202. It is to be appreciated that the wearable glucose monitoring device 202 may vary in implementation from the following discussion in various ways without departing from the spirit or scope of the described techniques. As noted above, for instance, wearable glucose monitoring device 202 may be implemented as other types of devices for monitoring biometric information, such as non-wearable devices (e.g., blood glucose meters requiring finger sticks), patches, smart watches or smart rings, and so forth.

In this example 200, the wearable glucose monitoring device 202 includes a sensor 204 and a sensor module 206. Here, the sensor 204 is depicted in the side view having been inserted subcutaneously into skin 208, e.g., of the user 102. The sensor module 206 is depicted in the top view as a dashed rectangle. The wearable glucose monitoring device 202 also includes a transmitter 210 in the illustrated example 200. Use of the dashed rectangle for the sensor module 206 indicates that it may be housed or otherwise implemented within a housing of the transmitter 210. In this example 200, the wearable glucose monitoring device 202 further includes adhesive pad 212 and attachment mechanism 214.

In operation, the sensor 204, the adhesive pad 212, and the attachment mechanism 214 may be assembled to form an application assembly, where the application assembly is configured to be applied to the skin 208 so that the sensor 204 is subcutaneously inserted as depicted. In such scenarios, the transmitter 210 may be attached to the assembly after application to the skin 208 via the attachment mechanism 214. Alternatively, the transmitter 210 may be incorporated as part of the application assembly, such that the sensor 204, the adhesive pad 212, the attachment mechanism 214, and the transmitter 210 (with the sensor module 206) can all be applied at once to the skin 208. In one or more implementations, this application assembly is applied to the skin 208 using a separate sensor applicator (not shown). Unlike the finger sticks required by conventional blood glucose meters, the user initiated application of the wearable glucose monitoring device 202 is nearly painless and does not require the withdrawal of blood. Moreover, the automatic sensor applicator generally enables the user 102 to embed the sensor 204 subcutaneously into the skin 208 without the assistance of a clinician or healthcare provider.

The application assembly may also be removed by peeling the adhesive pad 212 from the skin 208. It is to be appreciated that the wearable glucose monitoring device 202 and its various components as illustrated are simply one example form factor, and the wearable glucose monitoring device 202 and its components may have different form factors without departing from the spirit or scope of the described techniques.

In operation, the sensor 204 is communicatively coupled to the sensor module 206 via at least one communication channel, which can be a wireless connection or a wired connection. Communications from the sensor 204 to the sensor module 206 or from the sensor module 206 to the sensor 204 can be implemented actively or passively and these communications can be continuous (e.g., analog) or discrete (e.g., digital).

The sensor 204 may be a device, a molecule, and/or a chemical which changes or causes a change in response to an event that is at least partially independent of the sensor 204. The sensor module 206 is implemented to receive indications of changes to the sensor 204 or caused by the sensor 204. For example, the sensor 204 can include glucose oxidase, which reacts with glucose and oxygen to form hydrogen peroxide that is electrochemically detectable by the sensor module 206, which may include an electrode. In this example, the sensor 204 may be configured as or include a glucose sensor configured to detect analytes in blood or interstitial fluid that are indicative of glucose level using one or more measurement techniques. In one or more implementations, the sensor 204 may also be configured to detect analytes in the blood or the interstitial fluid that are indicative of other markers, such as lactate levels, which may improve accuracy in generating various predictions in connection with determining glucose insights. Additionally or alternately, the wearable glucose monitoring device 202 may include additional sensors to the sensor 204 to detect those analytes indicative of the other markers.

In another example, the sensor 204 (or an additional sensor of the wearable glucose monitoring device 202—not shown) can include a first and second electrical conductor and the sensor module 206 can electrically detect changes in electric potential across the first and second electrical conductor of the sensor 204. In this example, the sensor module 206 and the sensor 204 are configured as a thermocouple such that the changes in electric potential correspond to temperature changes. In some examples, the sensor module 206 and the sensor 204 are configured to detect a single analyte, e.g., glucose. In other examples, the sensor module 206 and the sensor 204 are configured to detect multiple analytes, e.g., sodium, potassium, carbon dioxide, and glucose. Additionally or alternatively, the wearable glucose monitoring device 202 includes multiple sensors to detect not only one or more analytes (e.g., sodium, potassium, carbon dioxide, glucose, and insulin) but also one or more environmental conditions (e.g., temperature). Thus, the sensor module 206 and the sensor 204 (as well as any additional sensors) may detect the presence of one or more analytes, the absence of one or more analytes, and/or changes in one or more environmental conditions.

In one or more implementations, the sensor module 206 may include a processor and memory (not shown). The sensor module 206, by leveraging the processor, may generate the biometric measurements 116 (glucose measurements in the illustrated example) based on the communications with the sensor 204 that are indicative of the above-discussed changes. Based on these communications from the sensor 204, the sensor module 206 is further configured to generate communicable packages of data that include at least one biometric measurement 116. In one or more implementations, the sensor module 206 may configure those packages to include additional data, including, by way of example a sensor identifier, a sensor status, temperatures that correspond to the biometric measurements 116, measurements of other analytes that correspond to the biometric measurements 116, and so forth. It is to be appreciated that such packets may include a variety of data in addition to at least one biometric measurement 116 without departing from the spirit or scope of the described techniques.

In implementations where the wearable glucose monitoring device 202 is configured for wireless transmission, the transmitter 210 may transmit the biometric measurements 116 wirelessly as a stream of data to a computing device. Additionally or alternatively, the sensor module 206 may buffer the biometric measurements 116 (e.g., in memory of the sensor module 206 and/or other physical computer-readable storage media of the wearable glucose monitoring device 202) and cause the transmitter 210 to transmit the buffered biometric measurements 116 later at various intervals, e.g., time intervals (every second, every thirty seconds, every minute, every five minutes, every hour, and so on), storage intervals (when the buffered biometric measurements 116 reach a threshold amount of data or a number of measurements), and so forth.

Having considered an example of an environment and an example of a wearable biometric information monitoring device, consider now a discussion of some examples of details of the techniques for using continuous biometric information monitoring for security in accordance with one or more implementations.

System Architecture

Figure 3:
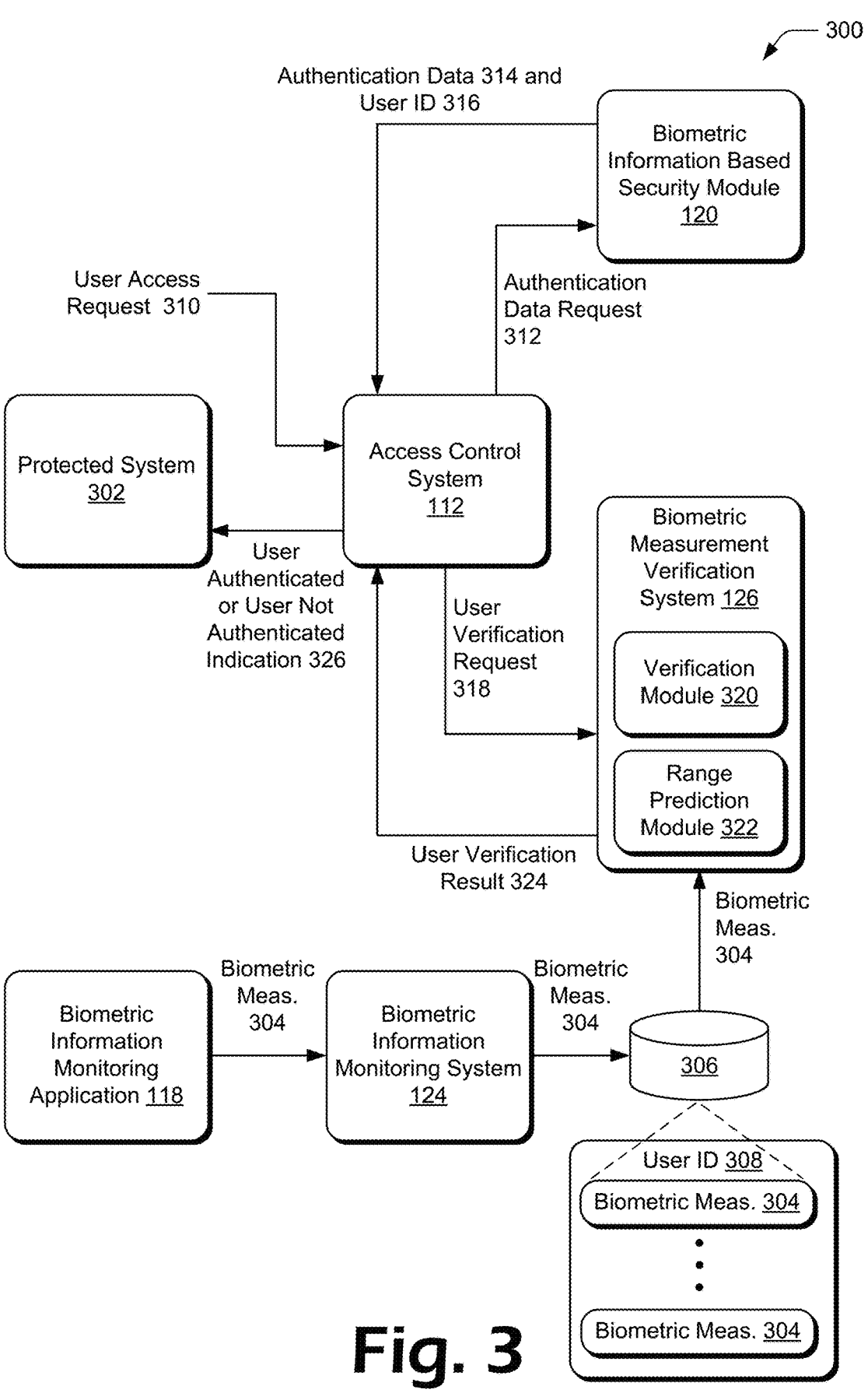
FIG. 3 is an illustration of an example of operation of the techniques described herein.

FIG. 3 is an illustration of an example 300 of operation of the techniques described herein. The example 300 illustrates communication among various ones of the access control system 112, the biometric information monitoring application 118, the biometric information based security module 120, the biometric information monitoring system 124, the biometric measurement verification system 126, and a protected system 302. The example 300 assumes that user 102 is attempting to access the protected system 302 to which access control system 112 gates or controls access.

The protected system 302 can store or provide access to any of a variety of information, data, applications, physical locations, and so forth to which access is restricted to authorized users (e.g., that is to be kept confidential, secret, secure, and so forth). For example, the protected system 302 may be an application (e.g., a banking application, a travel application, a merchant or shopping cart application) run on a web site accessed via the network 114, and the access control system 112 authenticates user 102 to use the application (e.g., transfer bank funds, purchase airline tickets, purchase consumer goods or services). By way of another example, the protected system 302 may be a security system (e.g., door locks, elevator locks, motion detectors) of a physical location such as an office building or home, and the access control system 112 authenticates user 102 to deactivate or activate the security system. By way of another example, the protected system 302 may be encrypted data of the user 102 (e.g., stored on the computing device 106 or a remote device), and the access control system 112 authenticates user 102 to decrypt the encrypted data.

Over time, the biometric information monitoring application 118 provides biometric measurements 304 (e.g., biometric measurements 116 of FIG. 1) to the biometric information monitoring system 124. As discussed above, these biometric measurements 304 can be provided to the biometric information monitoring system 124 continuously. The biometric information monitoring system 124 receives the biometric measurements 304 and stores the biometric measurements 304 in a storage device 306. The storage device 306 may represent one or more databases and also other types of storage capable of storing the biometric measurements 304. The storage device 306 is part of, for example, biometric information monitoring platform 110.

The biometric measurements 304 for a particular user are associated with a user identifier (ID) 308 of that particular user. The biometric information monitoring system 124 may be configured in a variety of ways to determine the user identifier 308 associated with a particular biometric measurement 304. For example, the biometric information monitoring application 118 may include the user identifier 308 with the biometric measurements 304. By away of another example, the biometric information monitoring application 118 may log into an account on the biometric information monitoring platform 110 allowing the biometric information monitoring system 124 to automatically associate a received biometric measurement 304 with the user identifier 308 for that account. In such scenarios, an indication of the user identifier 308 can be returned to the computing device 106. By way of another example, the biometric information monitoring system 124 may determine the user identifier 308 associated with particular biometric measurements 304 by analyzing various sets of received biometric measurements as discussed in more detail below.

The biometric information monitoring system 124 receives biometric measurements 304 for various different users (e.g., user 102 as well as other users in user population 108) and, for each different user, stores the biometric measurements 304 as associated with the user identifier 308 associated with that user.

The access control system 112 receives a user access request 310 for the user 102 to access the protected system 302. The access control system 112 can receive the user access request 310 directly from the user as illustrated or from another device or system (e.g., via the protected system 302).

In response to the user access request 310, the access control system 112 communicates an authentication data request 312 to the biometric information based security module 120. The authentication data request 312 is a request for data corresponding to one or more factors used to authenticate the user. In one or more implementations, the authentication data request 312 is a request for a biometric measurement that is input (e.g., specified) by the user as well as a password or personal identification number (PIN). Additionally or alternatively, one or more of these may be provided automatically by an application at the computing device 106, such as by a password manager running on the computing device 106.

Figure 4:
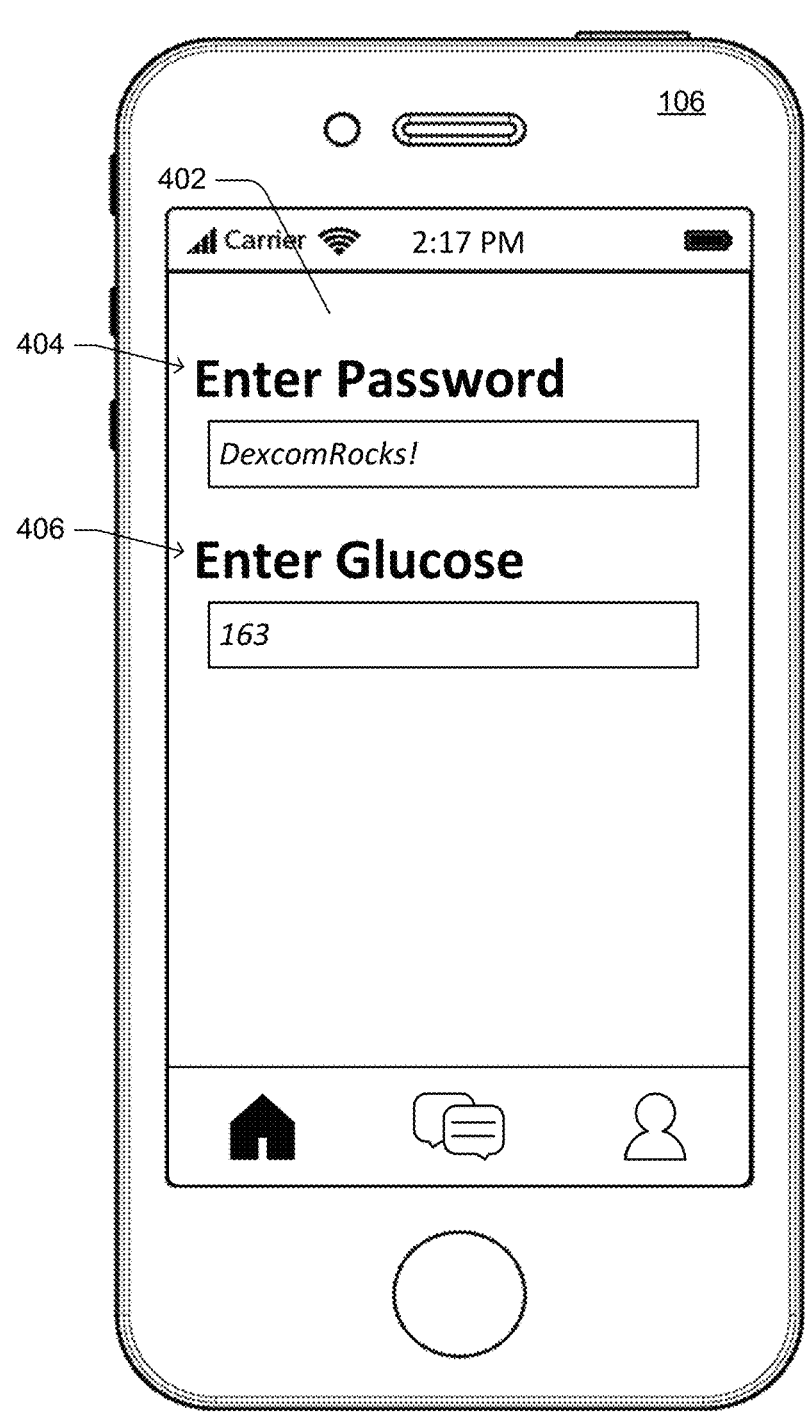
FIG. 4 depicts an example of an implementation of a user interface displaying prompts for authentication data.

FIG. 4 depicts an example 400 of an implementation of a user interface displaying prompts for authentication data. The illustrated example 400 includes an example of the computing device 106 displaying an example user interface 402 via a display device, e.g., a touchscreen. The user interface 402 is displayed, for example, in response to the authentication data request 312 from access control system 112.

The user interface 402 includes a prompt 404 for the user to enter a password and a prompt 406 for the user to enter a current glucose measurement for the user. The user enters the password (e.g., "DexcomRocks!" in the illustrated example) and the current glucose value (e.g., "163" in the illustrated example) via any of a variety of manners, such as a soft keyboard (not shown) displayed on the user interface 402, handwriting recognized by the touchscreen, audibly, and so forth.

In the illustrated example, the user obtains the current glucose measurement from a separate user interface (e.g., displayed by biometric information monitoring application 118) on the computing device 106, which displays the glucose measurement most recently obtained by the biometric information monitoring device 104.

Figure 5:
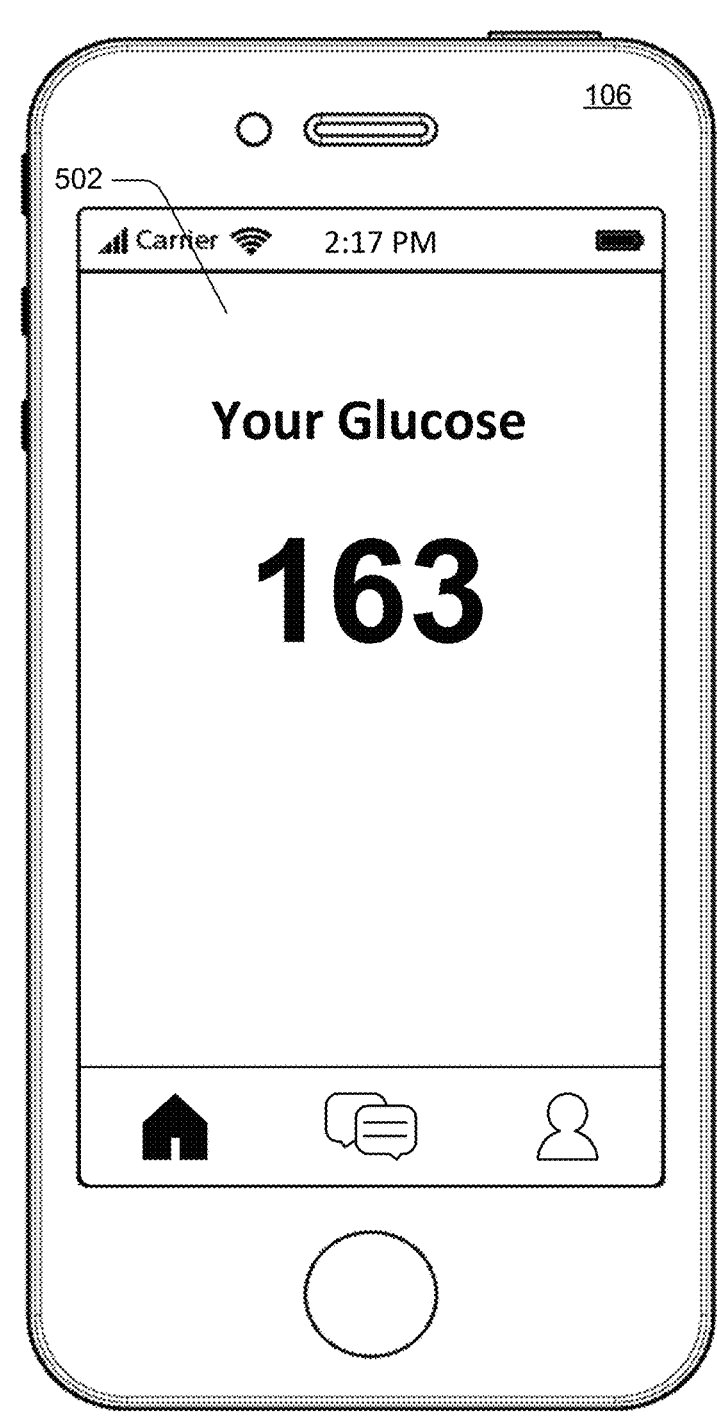
FIG. 5 depicts another example of an implementation of a user interface displaying a biometric measurement.

FIG. 5 depicts an example 500 of an implementation of a user interface displaying a biometric measurement. The illustrated example 500 includes an example of the computing device 106 displaying an example user interface 502 via a display device, e.g., a touchscreen. The user interface 502 is displayed, for example, in response to a user request to access his or her current glucose measurement, or a user request to run biometric information monitoring application 118.

As illustrated, the displayed glucose measurement of "163" is the glucose measurement most recently obtained by the biometric information monitoring device 104. Although the biometric information displayed in the example 500 is a glucose measurement, additionally or alternatively the user interface 502 can similarly be used to display other types of biometric information. In such a scenario, the user interface 502 displays the biometric measurement for the specific type of biometric information (e.g., heart rate measurement, blood oxygen measurement) rather than a glucose measurement.

Returning to FIG. 4, additionally or alternatively the current glucose measurement for the user may be displayed as part of user interface 402. Regardless of which user interface displays or otherwise presents the current glucose measurement, the user is given the current glucose measurement by the computing device 106 for entry in response to prompt 406.

The user interface 402 illustrates a user interface for two-factor authentication. Additionally or alternatively, the user interface 402 supports other numbers of factors in which case user interface 402 includes prompts for any additional factors. Similarly, in some scenarios single-factor authentication may be performed, in which case the user interface 402 does not display the prompt 404 for the user to enter a password.

In the example 400, the biometric information used for authentication is glucose measurements. Additionally or alternatively, the user interface 402 can similarly be used for other types of biometric information. In such a scenario, the user interface 402 includes a prompt for the specific type of biometric information (e.g., heart rate measurement, blood oxygen measurement) rather than for glucose measurement.

Returning to FIG. 3, the biometric information based security module 120 returns the authentication data 314 and user identifier 316 to the access control system 112. The authentication data 314 is the requested authentication data, e.g., the password and most recent biometric measurement input by the user. The user identifier 316 is the same identifier of the user 102 that the biometric measurements 304 are associated with. The user identifier 316 is, for example, a user identifier that the biometric information monitoring system 124 provided to the computing device 106 during a process of the user 102 logging into his or her account on the biometric information monitoring platform 110.

The access control system 112 also communicates a user verification request 318 to the biometric measurement verification system 126. The user verification request 318 includes the biometric measurement from the authentication data 314 as well as the user identifier 316 received from the biometric information based security module 120. The biometric measurement verification system 126 includes a verification module 322 and a range prediction module 320. The verification module 322 retrieves the biometric measurements 304 corresponding to the user identifier received in the user verification request 318, analyzes the biometric measurement specified by the user (and included in user verification request 318) relative to the received biometric measurements of the multiple biometric measurements, and returns a user verification result 324 indicating whether the user is verified based on this analysis. In one or more implementations, the analysis is based on a predicted range of biometric measurements generated by the range prediction module 320.

The verification module 322 determines whether the biometric measurement specified by the user (and included in user verification request 318) matches the multiple biometric measurements 304. This match can be determined based on the most recently received biometric measurement of the multiple biometric measurements 304 or based on multiple ones of the biometric measurements 304. The biometric measurement verification system 126 returns a user verification result 324 indicating that the user is verified in response to the biometric measurement specified by the user matching the multiple biometric measurements 304, and a user verification result 324 indicating that the user is not verified in response to the biometric measurement specified by the user not matching the multiple biometric measurements 304. Given the wide range of biometric measurements that the user 102 could have at any given time, the biometric measurement verification system 126 can determine that the user 102 is in possession of the computing device 106 (the computing device 106 is something physical that the user has) and thus verify the user 102 (subject to any other factors) if the biometric measurement specified by the user matches the multiple biometric measurements 304.

The verification module 322 uses any of a variety of rules or criteria to determine whether the biometric measurement specified by the user matches the multiple biometric measurements 304. In one or more implementations, the rules or criteria the verification module 322 uses include determining how long ago, relative to a current time, the most recently received biometric measurement 304 was received for the user 102. This determination is made, for example, by the biometric information monitoring system 124 recording a timestamp for each biometric measurement 304 indicating a date and time when the biometric measurement 304 was received by the biometric information monitoring system 124. The verification module 322 returns a user verification result 324 indicating that the user is not verified in response to the most recently received biometric measurement having been received more than a threshold amount of time before the current time (e.g., 20 or 30 minutes). In this scenario, the verification module 322 optionally includes an indication that the user is not verified due to the biometric measurement verification system 126 having insufficient biometric measurements to verify the user. Given the continuous receipt of biometric measurements, the verification module 322 can determine that the user 102 is not in possession of the computing device 106 (the computing device 106 is not something physical that the user has) if a biometric measurement has not been received from the computing device 106 for a threshold amount of time, and thus not verify the user 102.

In one or more implementations, the rules or criteria the verification module 322 uses include determining whether the biometric measurement specified by the user is an exact match (the same value) to the most recently received biometric measurement of the biometric measurements 304. The verification module 322 returns a user verification result 324 indicating that the user is verified in response to the biometric measurement specified by the user being an exact match to the most recently received biometric measurement of the biometric measurements 304, and a user verification result 324 indicating that the user is not verified in response to the biometric measurement specified by the user not being an exact match to the most recently received biometric measurement of the biometric measurements 304.

Additionally or alternatively, the rules or criteria the verification module 322 uses include comparing the biometric measurement specified by the user to a predicted range of biometric measurements corresponding to the current time for the user 102 as generated by the range prediction module 320. The range prediction module 320 generates the predicted range of biometric measurements based on any of various information regarding the biometric measurements 304, such as the biometric measurements 304 themselves, timestamps indicating when the biometric measurements 304 were received, and so forth. The range prediction module 320 uses any of a variety of public or proprietary techniques to determine the range of biometric measurements. The verification module 322 returns a user verification result 324 indicating that the user is verified in response to the biometric measurement specified by the user being within the predicted range of biometric measurements, and a user verification result 324 indicating that the user is not verified in response to the biometric measurement specified by the user not being within the predicted range of biometric measurements.

For example, the range prediction module 320 can determine the range of biometric measurements based on a threshold amount relative to the biometric measurement specified by the user. This threshold amount can be a fixed value, such as 10 milligrams per deciliter (mg/dL) for glucose measurements or 3 millimeters of mercury (mm HG) for blood oxygen measurements. Additionally or alternatively, this threshold amount can be a relative value, such as the biometric measurement 304 being within 10% of the biometric measurement specified by the user for glucose measurements or 5% of the biometric measurement specified by the user for blood oxygen measurements.

By way of another example, the biometric measurement verification system 126 can use a machine learning system to determine the range of biometric measurements. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

The machine learning system is trained, for example, by using training data that is sets of multiple biometric measurements and timestamps indicating when the biometric measurements 304 were received. Known labels are associated with the sets of biometric measurements indicating a range for the set of biometric measurements. The machine learning system is trained by updating weights or values of layers in the machine learning system to minimize the loss between ranges of biometric measurements generated by the machine learning system for the training data and the corresponding known labels for the training data. Various different loss functions can be used in training the machine learning system, such as cross entropy loss, mean squared error loss, and so forth.

Given the continuous receipt of biometric measurements, using such a machine learning system allows the biometric measurement verification system 126 to predict ranges that are dependent on the specific biometric measurement as well as the various timings of receipt of the biometric measurements.

The biometric measurement verification system 126 can use the predicted range of biometric measurements in a variety of different manners. For example, the rules or criteria the biometric measurement verification system 126 can use include determining how long ago, relative to a current time, the most recently received biometric measurement 304 was received for the user 102 as discussed above. If the most recently received biometric measurement was received more than a threshold amount of time (referred to as a predicted range threshold amount of time) before the current time (e.g., 1 or 2 minutes), then the biometric measurement verification system 126 checks whether the biometric measurement specified by the user (and included in user verification request 318) is within the predicted range of biometric measurements. The biometric measurement verification system 126 returns a user verification result 324 indicating that the user is verified in response to the biometric measurement specified by the user being within the predicted range of biometric measurements, and a user verification result 324 indicating that the user is not verified in response to the biometric measurement specified by the user not being within the predicted range of biometric measurements.

If the most recently received biometric measurement was received less than the predicted range threshold amount of time before the current time (e.g., 1 or 2 minutes), then the biometric measurement verification system 126 checks whether the biometric measurement specified by the user (and included in user verification request 318) is an exact match (e.g., the same value) with the most recently received biometric measurement. The biometric measurement verification system 126 returns a user verification result 324 indicating that the user is verified in response to the biometric measurement specified by the user being an exact match with the most recently received biometric measurement, and a user verification result 324 indicating that the user is not verified in response to the biometric measurement specified by the user not being an exact match with the most recently received biometric measurement.

In one or more implementations, the biometric measurement verification system 126 determines the predicted range threshold amount of time based on the size of the predicted range of biometric measurements. The size of the predicted range of biometric measurements refers to the number of values included in the range (e.g., the maximum value in the range minus the minimum value in the range plus one). The biometric measurement verification system 126 determines the predicted range threshold amount of time to be shorter for ranges of biometric measurements that are larger, and the predicted range threshold amount of time to be longer for ranges of biometric measurements that are smaller. For example, a range of 40 mg/dL for glucose measurements may have a predicted range threshold amount of time of 3 minutes whereas a range of 15 mg/dL for glucose measurements may have a predicted range threshold amount of time of 10 minutes. The larger the predicted range of biometric measurements, the easier it is for a stranger to guess a correct biometric measurement within the range, reducing the accuracy of the user verification result 324. By changing the threshold amount of time based on the size of the predicted range, larger predicted ranges have shorter threshold amounts of time, increasing the accuracy of the user verification result 324 by giving strangers less time to guess a correct biometric measurement within the range.

In one or more implementations, the rules or criteria the biometric measurement verification system 126 uses include determining whether the size of the predicted range of biometric measurements exceeds an upper threshold size. The biometric measurement verification system 126 returns a user verification result 324 indicating that the user is not verified in response to the size of the predicted range of biometric measurements exceeding an upper threshold size (e.g., 50 mg/dL for glucose measurements). Given the ability for a stranger to guess a correct biometric measurement if the size of the predicted range is too large, the biometric measurement verification system 126 can simply not rely on the predicted range of biometric measurements if the size of the predicted range is too large.

In one or more implementations, in response to the user verification request 318 and a determination that the user is verified, the biometric measurement verification system 126 generates a security token and includes the security token in the user verification result 324. The security token includes an expiration time (e.g., 10 or 15 minutes) after which the access control system 112 can no longer rely on the accuracy of the determination that the user is verified. The security token optionally includes additional information, such as the biometric measurement from the authentication data 314 as well as the user identifier 316 received from the biometric information based security module 120 that was included in the user verification request 318.

The access control system 112 returns the security token to the biometric measurement verification system 126 prior to the expiration time elapsing. In response to the security token, the biometric measurement verification system 126 uses any of a variety of rules or criteria to determine whether the user is verified and returns a user verification result 324 analogous to the discussion above. However, in response to the security token the biometric measurement verification system 126 takes into account any additional biometric measurements 304 that have been received by the biometric information monitoring system 124 after the security token was sent to the access control system 112. Accordingly, if the biometric measurement verification system 126 again determines that the user is verified, the user verification result 324 provides further certainty to the access control system 112 that the user 102 is in possession of the computing device 106. This process of the biometric measurement verification system 126 providing a security token and subsequently receiving the security token back from the access control system 112 can be repeated any number of times.

The access control system 112 receives the user verification result 324 and provides a user authenticated or user not authenticated indication 326 to the protected system 302 based on the user verification result 324. The access control system 112 can take into account various other factors when generating the user authenticated or user not authenticated indication 326, such as the password or PIN included in the authentication data 314. Evaluation of the other factors in determining user authenticated or user not authenticated indication 326 can be performed by the access control system 112 itself or various other devices or systems with which the access control system 112 communicates. If the user verification result 324 indicates the user is not authenticated, or evaluation of any other factor indicates that the user is not verified, the user authenticated or user not authenticated indication 326 indicates the user is not authenticated. Otherwise, the user authenticated or user not authenticated indication 326 indicates the user is authenticated. The protected system 302 then allows or does not allow the user 102 to access the protected system 302 in accordance with the user authenticated or user not authenticated indication 326.

Figure 6:
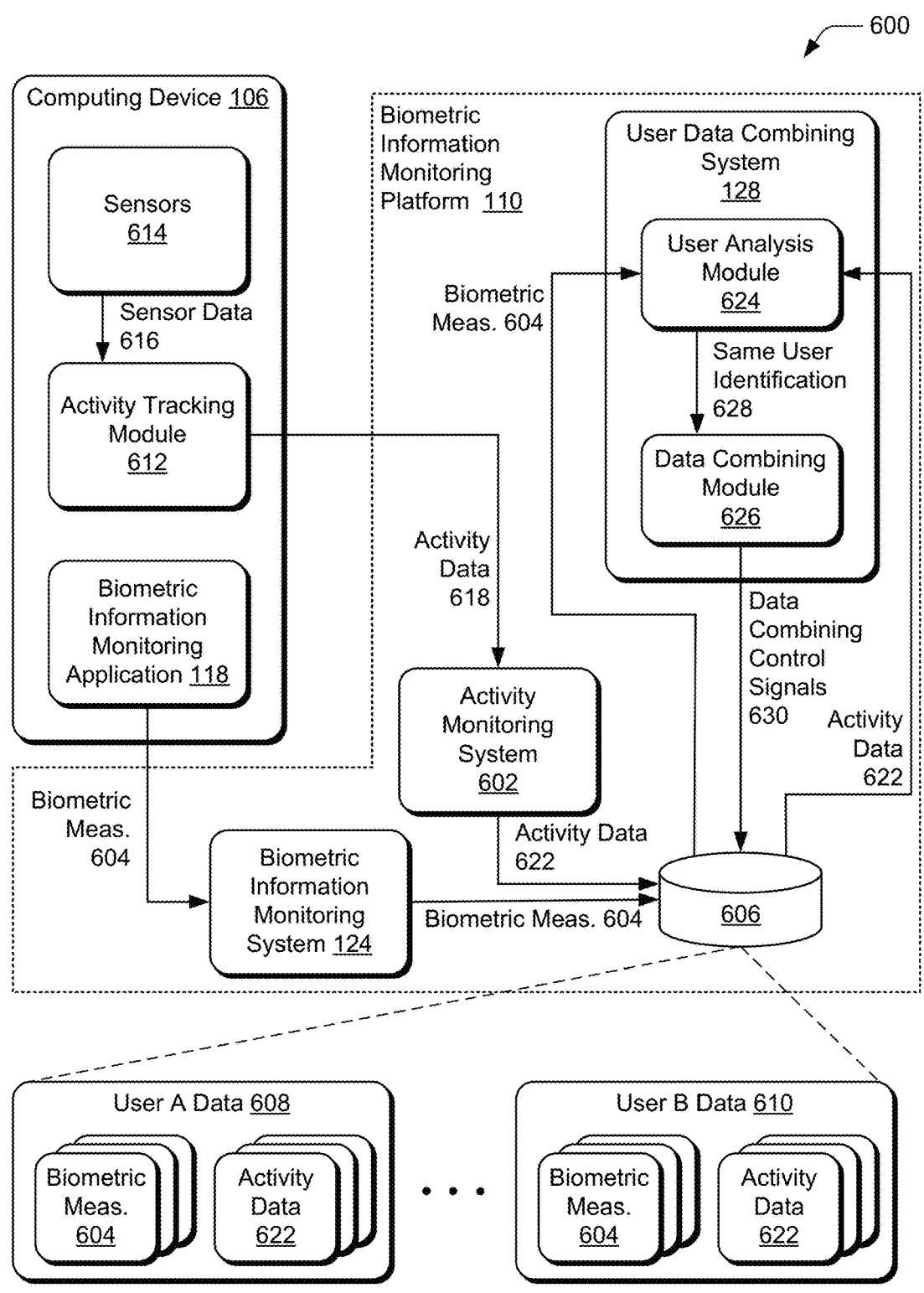
FIG. 6 is an illustration of another example of operation of the techniques described herein.

FIG. 6 is an illustration of another example 600 of operation of the techniques described herein. The example 600 illustrates communication among various ones of the computing device 106, biometric information monitoring system 124, user data combining system 128, and an activity monitoring system 602.

Over time, the biometric information monitoring application 118 provides biometric measurements 604 (e.g., biometric measurements 116 of FIG. 1) to the biometric information monitoring system 124. As discussed above, these biometric measurements 604 can be provided to the biometric information monitoring system 124 continuously. The biometric information monitoring system 124 receives the biometric measurements 604 and stores the biometric measurements 604 in a storage device 606. The storage device 606 may represent one or more databases and also other types of storage capable of storing the biometric measurements 604. The storage device 606 is part of, for example, biometric information monitoring platform 110. The biometric measurements 604 optionally include various metadata, such as a timestamp indicating when the biometric measurement was obtained (e.g., a timestamp added by the biometric information monitoring application 118 or the wearable biometric information monitoring device 104) or a timestamp indicating when the biometric measurement was received by the biometric information monitoring platform 110 (e.g., a timestamp added by the biometric information monitoring system 124).

The biometric measurements 604 for a particular user are associated with a user identifier of that particular user, each user identifier also corresponding to a user account. The biometric information monitoring system 124 may be configured in a variety of ways to determine the user identifier associated with a particular biometric measurement 604. For example, the biometric information monitoring application 118 may include the user identifier with the biometric measurements 604. By away of another example, the biometric information monitoring application 118 may log into a user account on the biometric information monitoring platform 110 allowing the biometric information monitoring system 124 to automatically associate a received biometric measurement 604 with the user identifier for that user account. Broadly, the user data combining system 128 analyzes biometric measurements or activity data received from the computing device 106 to determine when multiple user identifiers are associated with the same user and combines the biometric measurements 604 (and optionally additional user data as discussed in more detail below) so as to be associated with a single user identifier. The biometric information monitoring system 124 stores the biometric measurements 604 in the storage device 606 as user data associated with the user identifier.

In one or more implementations, the computing device 106 also includes an activity tracking module 612. Broadly, the activity tracking module 612 can generate activity data by monitoring any activity on the device including movement of the computing device 106, user interaction with the computing device 106, the environment in which the computing device 106 is situated (e.g., sounds, temperature, light level), and so forth. The activity tracking module 612 monitors any of a variety of activity of the computing device 106. For example, the activity tracking module 612 may receive data from any of a variety of different sensors 614, such as an accelerometer, a gyroscope, a thermal sensor, an audio sensor (e.g., a microphone), an ambient light sensor, a global positioning system (GPS) receiver, and so forth. The activity tracking module 612 receives sensor data 616 from the sensors 614 and provides activity data 618, including the sensor data 616, to an activity monitoring system 602. The activity tracking module 612 can generate activity data substantially continuously, analogous to the producing biometric measurements discussed above.

The activity tracking module 612 may also monitor various other activity on the computing device 106, such as a number of applications installed or running on the computing device 106, categories of (e.g., categorical spread of) applications installed or running on the computing device 106. The activity tracking module 612 may also monitor the pattern of usage of an application running on the computing device 106 by a user (e.g., biometric information monitoring application 118), such as time of day or day of week that the user performs various tasks with the application, how long the user interacts with the application, the specific tasks the user performs with the application, and so forth. This additional information monitored by the activity tracking module 612 is also included in the activity data 618.

The activity monitoring system 602 receives the activity data 618 and optionally the biometric measurements 604, for example from the biometric information monitoring system 124 or retrieved from the storage device 606. The activity data 618 or the biometric measurements 604 are analyzed by the activity monitoring system 602 to determine various additional activity data for the user, such as sleep/wake cycles, daily movement patterns, and so forth. This additional activity data, as well as the activity data 618, is included in the activity data 622 that the activity monitoring system 602 stores in the storage device 606. The activity monitoring system 602 stores the activity data 622 in the storage device 606 as user data associated with the user identifier.

Biometric measurements 604 as well as activity data 622 for multiple user identifiers (e.g., user A data 608 for user A and user B data 610 for user B) are illustrated in FIG. 6. User A data 608 includes one set of biometric measurements 604 and a set of activity data 622, and user B data 610 includes another set of biometric measurements 604 and activity data 622. It is to be appreciated that user data for any number of user identifiers can be stored in storage device 606.

Situations arise where the same user of computing device 106, or multiple computing devices 106, creates different user accounts on the biometric information monitoring platform 110. This can be due to various different reasons, such as a user forgetting his login details (e.g., user identifier or password) for an account he previously created, a user forgetting he created an account, and so forth. This results in user data for the same user being associated with two different user identifiers.

The user data combining system 128 includes a user analysis module 624 and a data combining module 626. The user analysis module 624 analyzes user data to determine when user data associated with multiple user identifiers in storage device 606 are associated with the same user. This user data may refer to one or more of the biometric measurements 604 of a user, activity data 622 of a user, timestamps or other metadata associated with the biometric measurements 604 or activity data 622, and so forth. The data combining module 626 combines the user data associated with the multiple user identifiers so that the user data is associated with the same user identifier.

The user analysis module 624 repeatedly identifies two user identifiers having associated user data stored in storage device 606 for analysis. The user analysis module 624 retrieves one or both of the biometric measurements 604 and the activity data 622 for the two identified user identifiers. The user analysis module 624 can identify which two user identifiers to retrieve user data for in any of a variety of manners, such as randomly or pseudorandomly, in time order of user account creation so that each possible pair of user identifiers is eventually identified, and so forth. The user analysis module 624 may also use various rules or criteria to identify which two user identifiers to retrieve user data for analysis, such as user account creation date rules or criteria (e.g., identify user identifiers for two user accounts created on different days because it would be unlikely that the same user would create two user accounts on the same day, identify user identifiers for two user accounts that have been created at least a threshold number of days, such as 30 days apart), user account creation time rules or criteria (e.g., identify user identifiers for two user accounts created at approximately the same time on two different days because it would be likely that the same user would create two accounts at approximately the same time of day), amount of data rules or criteria (e.g., identify user identifiers for user accounts having less than a threshold amount of user data, such as 30 biometric measurements, to pair with user identifiers for user accounts having more than the threshold amount of data), and so forth.

The user analysis module 624 analyzes one or both of the biometric measurements 604 and the activity data 622 associated with the two identified user identifiers. In one or more implementations, for each user identifier the user analysis module 624 identifies characteristics of the user associated with the user identifier, also referred to as a fingerprint of the user, based on one or both of the biometric measurements 604 and the activity data 622. The user analysis module 624 generates the fingerprint of the user associated with the user identifier by converting the biometric measurements 604 or activity data 622 into one or more vectors. Various vectors can be generated, such as a vector indicating times of day when biometric measurements spike (e.g., glucose measurements exceed a threshold amount, such as 200), times of day or days of week when the user is exercising (e.g., based on heart rate measurement exceeding a threshold amount, such as 125 and activity data indicating a large amount of movement of the computing device 106), times of day when biometric measurements are certain values (e.g., times of day when glucose values range from 70-100, times of day when glucose values range from 101-130, from times of day when glucose values range 131-160, and so forth), and so forth. Multiple vectors generated from the biometric measurements 604 or the activity data 622 can be combined in various manners, such as concatenated, to generate the fingerprint. The user analysis module 624 compares the fingerprints generated for users associated with two different user identifiers and determines a similarity of the fingerprints.

If two generated fingerprints are similar enough to one another then the user analysis module 624 determines that the user identifiers from which the two fingerprints were generated correspond to the same user. The user analysis module 624 can determine whether two generated fingerprints are similar enough to one another in any of a variety of manners. For example, user analysis module 624 can determine the difference between the two fingerprints (two vectors) using any of a variety of public or proprietary techniques. If the difference between the two fingerprints is less than a threshold amount (e.g., which may be selected based on the number of elements in the two vectors, with the threshold amount being larger for larger numbers of elements in each of the two vectors), then the two fingerprints are determined to correspond to the same user. If the two fingerprints are not less than the threshold amount, then the two fingerprints are determined to correspond to different users.

Additionally or alternatively, the user analysis module 624 can use a machine learning system to determine whether the two fingerprints correspond to the same user. The machine learning system is trained, for example, by using training data that is fingerprints generated for user accounts. Known labels (e.g., "same user or "not same user") are associated with pairs of fingerprints indicating whether the fingerprints correspond to the same user. The machine learning system is trained by updating weights or values of layers in the machine learning system to minimize the loss between classifications of "same user" or "not same user" generated by the machine learning system and the corresponding known labels for the training data. Various different loss functions can be used in training the machine learning system, such as cross entropy loss, hinge loss, and so forth.

If two user identifiers are determined to be associated with the same user, the user analysis module 624 provides a same user identification 628 to the data combining module 626. The data combining module 626 provides data combining control signals 630 to the storage device 606 to combine the user data associated with the two user identifiers, and optionally delete the user accounts associated with at least one of the two user identifiers.

In response to the same user identification 628, the data combining module 626 combines the user data associated with the two user identifiers. Combining the user data associated with two user identifiers refers to having the user data associated with the two user identifiers associated with a single user identifier.

FIG. 7 illustrates an example 700 of combining user data associated with two user identifiers. The example 700 includes user A data 702 and user B data 704. The user A data 702 includes multiple biometric measurements 706 (e.g., biometric measurements 604 from FIG. 6 for user A) and multiple activity data 708 (e.g., activity data 622 from FIG. 6 for user A). Similarly, the user B data 704 includes multiple biometric measurements 710 (e.g., biometric measurements 604 from FIG. 6 for user B) and multiple activity data 712 (e.g., activity data 622 from FIG. 6 for user B).

The user A data 702 and the user B data 704 are combined and associated with a single user identifier, which is illustrated as user A data 702. As illustrated, user A is associated with the user A data 702 that includes the biometric measurements 706 and activity data 708 from user A data 702, as well as the multiple biometric measurements 710 and multiple activity data 712 from user B data 704. Although illustrated as copying the multiple biometric measurements 710 and multiple activity data 712 so as to be associated with user A, additionally or alternatively the multiple biometric measurements 706 and multiple activity data 708 can be copied so as to be associated with user B, or a new user identifier (not shown) can be created and the multiple biometric measurements 706, multiple activity data 708, multiple biometric measurements 710, and multiple activity data 712 can be copied so as to be associated with the new user identifier.

Returning to FIG. 6, in situations in which biometric measurements or activity data is copied so as to be associated with one user identifier rather than another user identifier, the data combining control signals 630 include signals to delete the user account corresponding to the user identifier from which biometric measurements or activity data were copied. In situations in which a new user identifier is created and biometric measurements or activity data is copied so as to be associated with the new user identifier rather than the two identified user identifiers, the data combining control signals 630 include signals to delete user accounts corresponding to both of the two identified user accounts after the biometric measurements or activity data has been copied.

The data combining module 626 can select which of the two identified user identifiers to associate the user data with in any of a variety of manners. For example, the data combining module 626 may select to associate the user data with the user account that includes the most biometric measurements or activity data, may select to associate the user data with the user account that most recently received biometric measurements (or activity data) from a computing device 106, and so forth.

In one or more implementations, the data combining module 626 automatically combines the user data for the two user identifiers identified in the same user identification 628. Additionally or alternatively, the data combining module 626 communicates a prompt to one of the two users, such as via the biometric information monitoring application 118. For example, when a user of computing device 106 is logged in to biometric information monitoring platform 110, the data combining module 626 communicates a prompt for biometric information monitoring application 118 to display a prompt notifying the user of the two user identifiers and querying the user as to whether the user desires to combine the user data associated with the two user identifiers. In such situations, the user data associated with the two user identifiers are combined only in response to user approval to combine the user data.

Combining user data associated with two user identifiers that are associated with the same user allows biometric information monitoring platform 110 to have a more accurate description of the biometric measurements associated with the user because the biometric measurements for the different user accounts are all associated with a single user identifier. Having this information associated with a single user identifier, allows for better technical support, better longitudinal data, and provide additional value to users, payers (e.g., insurance companies paying for medical services for users), healthcare providers, the administrator or owner of the biometric information monitoring platform 110, and so forth. For example, having this information associated with a single user identifier can reduce registration steps users take at a healthcare provider because the information can be readily transferred to the healthcare provider from the biometric information monitoring platform 110. By way of another example, having this information associated with a single user identifier can instill confidence in payers that longitudinal data on a patient getting access to continuous biometric measurement monitoring is indeed increasing user (e.g., patient) outcomes (e.g., number of low glucose values, amount of time the biometric measurements of the user are in an appropriate or healthy range, appropriate HbA1c values, and so forth).

By way of another example, combining user data associated with two user identifiers can help users who forget their login details. E.g., a user could simply wear a new sensor while logged into a new user account associated with a new user identifier and after a particular amount of time the user data combining system 128 would "recognize" who the user is, combine their new user data with their previous user data, and begin storing biometric measurements 604 and activity data 622 as associated with their previous identifier (effectively re-logging the user in to their previous account. By way of another example, having this information in the single user account can allow for remote detection and verification of a patient wearing the device, such as part of a long-term disease management program. E.g., a patient on a diabetes management program could have an annual check-up with a healthcare provider performed during their daily living with all of the biometric measurements obtained over the previous user being available to the healthcare provider in the single user account. Furthermore, by combining user data associated with two user identifiers as discussed herein, the healthcare provider or payer can be confident that it was that user (e.g., as opposed to a friend, family member, or other person) because the user data would not have been combined had the user analysis module 624 not determined that the user data was associated with the same user.

FIG. 8 is an illustration of another example 800 of operation of the techniques described herein. The example 800 illustrates communication between the wearable biometric information monitoring device 104 and biometric information monitoring application 118. The wearable biometric information monitoring device 104 includes a biometric measurement acquisition module 802, a security key generation module 804, and a communication module 806. One or more of the biometric measurement acquisition module 802, the security key generation module 804, and the communication module 806 may be included as part of the sensor module 206 of FIG. 2.

The biometric measurement acquisition module 802 acquires (e.g., generates) biometric measurements 808 by detecting changes in a sensor of the wearable biometric information monitoring device 104 or analytes detected by the sensor of the wearable biometric information monitoring device 104 as discussed above. As discussed above, these biometric measurements 808 can be generated continuously.

For each biometric measurement 808, the security key generation module 804 generates a security key 810. The security key generation module 804 generates security key 810 in any of a variety of manners based on one or more functions, such as at least one hash function. For example, a one-way or cryptographic hash function may generate a hash value based on one or more biometric measurements 808. The security key generation module 804 may generate the security key 810 based on a single biometric measurement 808 or alternatively multiple biometric measurements 808. For example, the security key generation module 804 may combine a sequence or series of biometric measurements 808 (e.g., the most recently received x biometric measurements 808, where x is any number greater than 1, such as 15). Multiple biometric measurements 808 can be combined in any of a variety of manners, such as added together, concatenated, and so forth.

The security key generation module 804 provides the security key 810 to the communication module 806, which can use the security key 810 in any of a variety of manners. In one or more implementations, the security key 810 is a connection key used by the communication module 806 and the biometric information monitoring application 118 to identify one another. Communication 812 with the security key 810 (used as a connection key) is performed, allowing the biometric information monitoring application 118 to distinguish wearable biometric information monitoring device 104 from other wearable biometric information monitoring devices that may be within communication range of the biometric information monitoring application 118. Different wearable biometric information monitoring devices (e.g., worn by different users) would provide different security keys given that the security keys are generated based on the biometric measurements generated by each wearable biometric information monitoring device 104, allowing the security keys 810 to be used by the biometric information monitoring application 118 to distinguish different wearable biometric information monitoring devices from one another.

For example, the communication module 806 may communicate the security key 810 to the biometric information monitoring application 118 along with, or independent of, a biometric measurement 808. The communication module 806 and the biometric information monitoring application 118 both maintain the security key 810. The communication module 806 includes the security key 810 with subsequent communications of biometric measurements 808 to the biometric information monitoring application 118, allowing the biometric information monitoring application 118 to know that the biometric measurements are received from the wearable biometric information monitoring device 104.

Additionally or alternatively, the security key 810 can be used as an encryption key. Such an encryption key can be used to encrypt data that communication module 806 communicates to biometric information monitoring application 118, encrypt data that wearable biometric information monitoring device 104 stores at computing device 106 (such as subsequent biometric measurements stored in storage device 122), and so forth. For example, the security key 810 may be used as a symmetric encryption key to encrypt a subsequent biometric measurement 808 (e.g., the next biometric measurement 808 in a series of biometric measurements 808). The biometric information monitoring application 118, having received the previous biometric measurement 808, is able to reproduce the symmetric encryption key allowing the biometric information monitoring application 118 to decrypt the encrypted subsequent biometric measurement 808.

FIG. 9 is an illustration of another example 900 of operation of the techniques described herein. The example 900 illustrates communication between the computing device 106 and the biometric information monitoring platform 110. The computing device 106 includes a biometric measurement acquisition module 902, a security key generation module 904, and a communication module 906.

The biometric measurement acquisition module 902 acquires (e.g., receives) biometric measurements 908 from the wearable biometric information monitoring device 104 as discussed above. In one or more implementations, the biometric measurement acquisition module 902 is included as part of the biometric information monitoring application 118. As discussed above, these biometric measurements 908 can be received continuously.

For each biometric measurement 908, the security key generation module 904 generates a security key 910. The security key generation module 904 generates security key 910 in any of a variety of manners based on one or more functions, such as at least one hash function. For example, a one-way or cryptographic hash function may generate a hash value based on one or more biometric measurements 908. The security key generation module 904 may generate the security key 910 based on a single biometric measurement 908 or alternatively multiple biometric measurements 908. For example, the security key generation module 904 may combine a sequence or series of biometric measurements 908 (e.g., the most recently received x biometric measurements 908, where x is any number greater than 1, such as 15). Multiple biometric measurements 908 can be combined in any of a variety of manners, such as added together, concatenated, and so forth.

The security key generation module 904 provides the security key 910 to the communication module 906, which can use the security key 910 in any of a variety of manners. In one or more implementations, the security key 910 can be used as an encryption key. Such an encryption key can be used to encrypt data that communication module 906 communicates to biometric information monitoring platform 110, to encrypt data that is stored at computing device 106 (such as subsequent biometric measurements stored in storage device 122), and so forth. For example, the security key 910 may be used as a symmetric encryption key to encrypt a subsequent biometric measurement 908 (e.g., the next biometric measurement 908 in a series of biometric measurements 908). The biometric information monitoring platform 110, having received the previous biometric measurement 908, is able to reproduce the symmetric encryption key allowing the biometric information monitoring platform 110 to decrypt the encrypted subsequent biometric measurement 908.

This process can be repeated for a series of biometric measurements 908, with each security key be used to encrypt the subsequent biometric measurement 908 in the series. E.g., if the biometric measurements 908 are a series of multiple (n) biometric measurements $x_1, x_2, \ldots, x_n$, each biometric measurement $x_i$ is encrypted with a security key 910 generated from biometric measurement $x_{i-1}$. Accordingly, any change to a biometric measurement 908 in the series, or a security key 910 generated for a biometric measurement 908 in the series, would invalidate all subsequent biometric measurements.

In such scenarios where each security key is used to encrypt the subsequent biometric measurement 908, the one or more functions applied by the security key generation module 904 may use as input a combination of the biometric measurement 908 and one or more other values, such as the most recent previously generated security key 910, to generate a current security key 910. This combination can take various forms, such as adding the biometric measurement 908 to the security key 910, concatenating the biometric measurement 908 and the security key 910, and so forth.

Additionally or alternatively, the security key generation module 904 applies one or more functions (e.g., equations) to the biometric measurements 908 to obtain the security key 910, these one or more functions having corresponding validation functions that can be applied to generate the biometric measurement 908 from the security key 910. These validation functions are maintained at the biometric information monitoring platform 110 and are not included in the computing device 106. Accordingly, upon receipt of a biometric measurement 908 and security key 910, the biometric information monitoring platform 110 can use these validation functions with the security key 910 to generate a copy of the biometric measurement 908 and thus validate the honesty or accuracy of the biometric measurement 908. Security of the biometric measurements is further enhanced by not revealing these validation functions to the computing device 106, keeping the validation functions secret from any malicious user of a computing device 106.

Additionally or alternatively, the security key generation module 904 applies one or more functions (e.g., equations) to the biometric measurements 908 to obtain the security key 910, these one or more functions having corresponding validation functions that can be applied to generate a security key 910 from the biometric measurement 908. These validation functions are maintained at the biometric information monitoring platform 110 and are not included in the computing device 106. Accordingly, upon receipt of a biometric measurement 908 and security key 910, the biometric information monitoring platform 110 can use these validation functions with the biometric measurement 908 to generate a copy of the security key 910 that is compared to the received security key 910, and thus can validate the honesty or accuracy of the biometric measurement 908. Security of the biometric measurements is further enhanced by not revealing these validation functions to the computing device 106, keeping the validation functions secret from any malicious user of a computing device 106.

Although discussed in example 900 with reference to communication between the computing device 106 and the biometric information monitoring platform 110, these techniques for using security keys can be used analogously between the wearable biometric information monitoring device 104 and the computing device 106 (e.g., in example 800 discussed above).

Figure 10:
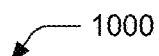
FIG. 10 is an illustration of an example system illustrating example operation of the techniques described herein.

FIG. 10 is an illustration of an example system 1000 illustrating example operation of the techniques described herein. The system 1000 illustrates communication among a biometric measurement receiving module 1002, a protection module 1004, a biometric measurement management module 1006, a recipient computing device 1008, and a set of computing devices 1010. In one or more implementations, the biometric measurement acquisition module 1002, protection module 1004, and biometric measurement management module 1006 are included as part of biometric information monitoring application 118.

The biometric measurement receiving module 1002 receives (e.g., from wearable biometric information monitoring device 104) biometric measurements 1012 from the wearable biometric information monitoring device 104 as discussed above. As discussed above, these biometric measurements 1012 can be received continuously.

For one or more biometric measurements 1012, the protection module 1004 protects one or more biometric measurements 1012 so as to be retrievable only by a recipient associated with a second computing device (e.g., recipient computing device 1008). This recipient is, for example, a user that the user of wearable biometric information monitoring device 104 has decided to sell, license, or otherwise give his or her biometric measurements 1012 to. In one or more implementations, the protection module 1004 protects the biometric measurements 1012 by encrypting the biometric measurements 1012 with a public key of a public/private key pair of the recipient, thereby ensuring that only the recipient (in possession of the private key of the public/private key pair) is able to decrypt the biometric measurements 1012.

The protection module 1004 provides the protected biometric measurements 1014 to the biometric measurement management module 1006, which communicates a verification request 1016 to the set of computing devices 1010. The verification request 1016 is, for example, an identification of the protected biometric measurements 1014 and the recipient associated with the recipient computing device 1008. The set of computing devices 1010 analyze the verification request 1016 to verify the protected biometric measurements 1014 for use by the recipient computing device 1008. The recipient computing device 1008 is allowed to use the protected biometric measurements 1014 in response to the set of computing devices 1010 verifying the protected glucose measurement for use by the second computing device.

By way of example, the verification request 1016 can include a block with an identification of the protected biometric measurements 1014 and the recipient associated with the recipient computing device 1008, and the set of computing devices 1010 can be blockchain approver devices. The set of computing devices 1010 verifying the protected biometric measurements 1014 for use by the recipient computing device 1008 refers to the set of computing devices 1010 agreeing to add the block identifying the protected biometric measurements 1014 and the recipient associated with the recipient computing device 1008 to a blockchain. A blockchain refers to a series or chain of blocks that maintains a record of transactions across multiple computing devices in a peer-to-peer network. In response to the set of computing devices 1010 verifying the protected biometric measurements 1014 for use by the recipient computing device 1008, the recipient computing device 1008 is allowed to use the protected biometric measurements 1014. E.g., an application running on the recipient computing device 1008 unprotects, such as by decrypting, the protected biometric measurements 1014, allowing access to the biometric measurements 1014 by other applications on the recipient computing device 1008.

Figure 11:
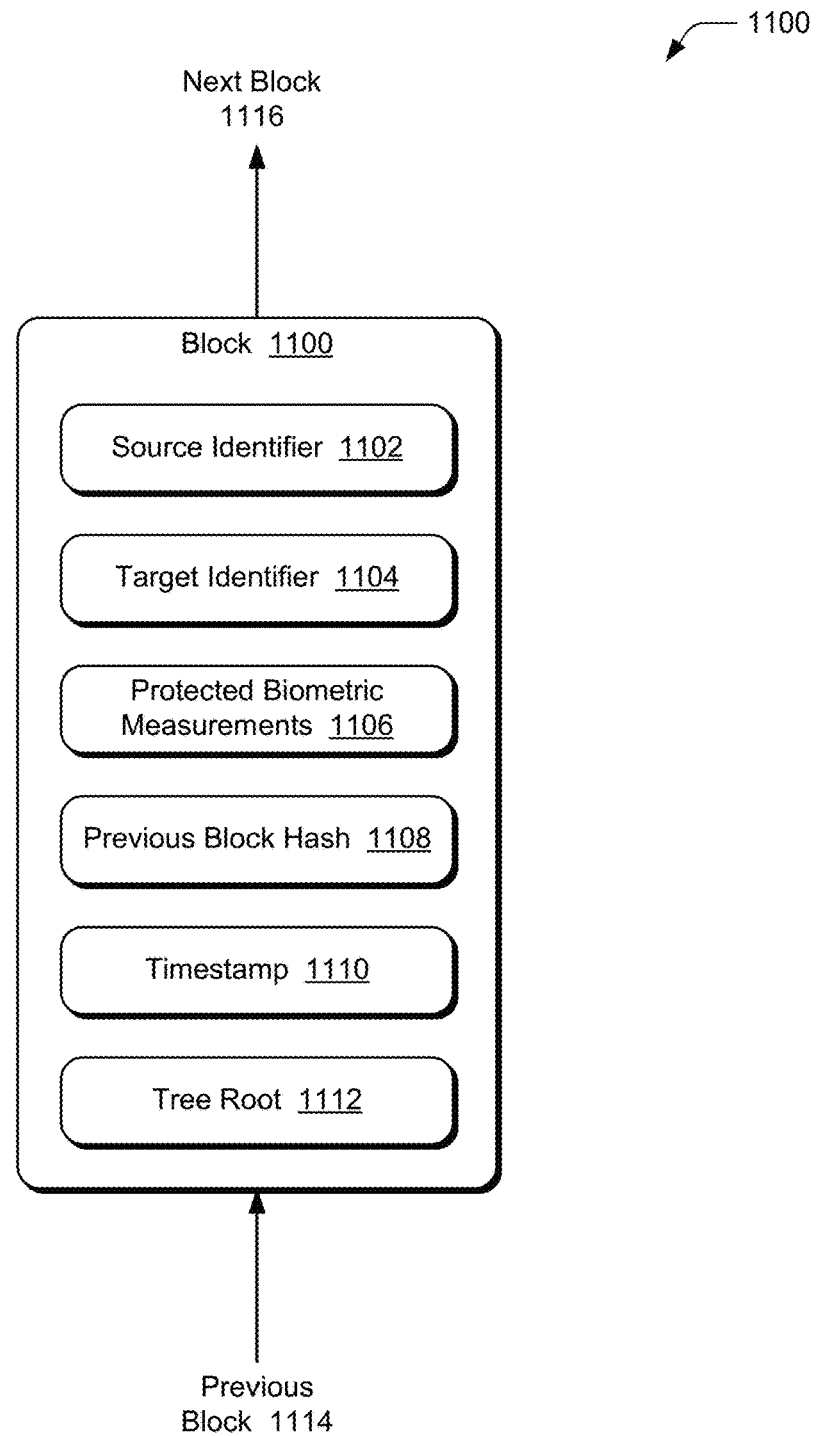
FIG. 11 illustrates an example block of a blockchain.

FIG. 11 illustrates an example block 1100 of a blockchain that can be included in the verification request 1016. The block 1100 includes a source identifier 1102, a target identifier 1104, protected biometric measurements 1106, a previous block hash 1108, a timestamp 1110, and a tree root 1112. The block 1100 is a block in a blockchain having a previous block 1114 and a next block 1116.

The source identifier 1102 is an identifier of the source of the protected biometric measurements 1106. The source identifier 1102 allows different users or devices to be distinguished from one another but need not describe the identity of (e.g., name or other personally identifying information) of the source of the protected biometric measurements 1106.

The target identifier 1104 is an identifier of the target of the protected biometric measurements 1106. Similar to the source identifier 1102, the target identifier 1104 allows different users or devices to be distinguished from one another but need not describe the identity of (e.g., name or other personally identifying information) of the target of the protected biometric measurements 1106.

The protected biometric measurements 1106 are the protected biometric measurements 1014 of FIG. 10. As discussed above, the protected biometric measurements 1106 may be protected by being encrypted with public key of a public/private key pair associated with the target identifier 1104.

The previous block hash 1108 is a hash of the previous block 1114. The biometric measurement management module 1006 can generate the previous block hash 1108 using any of a variety of cryptographic hash functions, such as any of the Secure Hash Algorithm (SHA) family of hash functions (e.g., SHA256).

The timestamp 1110 is a date and time for the block 1100. This date and time can be, for example, the date and time that the biometric measurement management module 1006 creates the block 1100 or requests to add the block to the blockchain.

The tree root 1112 is a data structure to summarize the transactions in the block 1100. The tree root 1112 is, for example, a cryptographic hash of all other portions of the block 1100 (e.g., all of block 1100 except for tree root 1112) or only selected portions of the block 1100 (e.g., the protected biometric measurements 1106, the protected biometric measurements 1106 and the timestamp 1110). The biometric measurement management module 1006 can generate the tree root 1112 using any of a variety of cryptographic hash functions, such as any of the SHA family of hash functions (e.g., SHA256).

Returning to FIG. 10, in one or more implementations the protection module 1004 protects each biometric measurement 1012. Additionally or alternatively, the protection module 1004 groups multiple biometric measurements 1012 together and protects the combination of biometric measurements 1012 (optionally along with metadata associated with the biometric measurements 1012). The protection module 1004 can group the biometric measurements 1012 together using any of a variety of rules or criteria, such as a particular time duration (e.g., group all biometric measurements 1012 received in a single day or other 24-hour period together), association with a session (e.g., group all biometric measurements 1012 received between the user logging into, via the biometric information monitoring application 118, the biometric information monitoring platform 110 and the user logging out of the biometric information monitoring platform 110), and so forth.

The use of protection module 1004 and biometric measurement management module 1006 helps ensure that biometric measurements 1012 are formed consistently (e.g., including the same fields for the biometric measurements and metadata associated with the biometric measurements), and the set of computing devices 1010 help enforce this consistency by refusing to approve or verify blocks that are not formed in the proper manner. Furthermore, the individual users can remain anonymous as discussed above, being associated only with identifiers that need not identify their names or other personally identifying information. Furthermore, by using a blockchain, the biometric measurements in the blocks are protected from being modified.

The biometric measurements in the blocks can be owned, licensed, transferred, made publicly available, and so forth. For example, any recipient may be permitted to access the biometric measurements in blocks. This is accomplished, e.g., by not protecting (not encrypting) the biometric measurements in the blocks.

By way of another example, the biometric measurements may be collected by one entity and licensed to other entities. For example, the biometric information monitoring platform 110 or the computing device 106 may license (e.g., sell for a fee and a specific term) the biometric measurements received from various users. In situations in which the biometric information monitoring platform 110 licenses the biometric measurements, users may be compensated financially for allowing their biometric measurements to be licensed (e.g., the users may be paid $10 per login session or per day). By way of another example, the biometric information monitoring platform 110 or the computing device 106 may sell outright (e.g., transfer ownership of) the biometric measurements to another entity (e.g., a medical company doing diabetes research). Various combinations of these may also be used, such as the biometric information monitoring platform 110 licensing the biometric measurements to other entities, some of which further license the biometric measurements and others of which sell outright (e.g., transfer ownership of) the biometric measurements to other entities.

Although the example system 1000 is discussed with reference to the biometric measurement acquisition module 1002, protection module 1004, and biometric measurement management module 1006 being included as part of biometric information monitoring application 118, additionally or alternatively the biometric measurement acquisition module 1002, protection module 1004, and biometric measurement management module 1006 are included as part of biometric information monitoring platform 110. In such situations, the source of the biometric information can be the biometric information monitoring platform 110 (e.g., an identifier associated with the biometric information monitoring system 124).

Having discussed exemplary details of the techniques for user interfaces for glucose insight presentation, consider now some examples of procedures to illustrate additional aspects of the techniques.

Example Procedures

This section describes examples of procedures for using continuous biometric information monitoring for security. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

FIG. 12 depicts a procedure 1200 in an example implementation in which continuously monitored biometric information is used to verify a user. Procedure 1200 is performed, for example, by a biometric information monitoring platform, such as the biometric information monitoring platform 110.

Individual biometric measurements of a user of a computing device are received continuously from the computing device (block 1202). This results in a set of multiple biometric measurements of the user obtained over time.

The multiple biometric measurements are associated with an identifier of the user (block 1204). In one or more implementations the identifier of the user is used to distinguish different users from one another and need not include any personally identifying information of the user.

A user verification request is received from an access control system (block 1206). The user verification request is a request to verify the user and includes a biometric measurement specified by the user and an identifier of the user. The biometric measurement specified by the user is a biometric measurement manually input by the user.

A check is made as to whether the biometric measurement specified by the user matches the received biometric measurements (block 1208). Whether the biometric measurement specified by the user matches the received biometric measurements can be determined in any of a variety of manners as discussed above, such as the biometric measurement specified by the user being an exact match to the most recently received biometric measurement, the biometric measurement specified by the user being within a predicted range of biometric measurements, and so forth.

Procedure 1200 proceeds based on whether the biometric measurement specified by the user matches the received biometric measurements. If the biometric measurement specified by the user matches the received biometric measurements, then a user verification result indicating the user is verified is returned (block 1210). The user verification result is returned, for example, to the access control system from which the user verification request was received. However, if the biometric measurement specified by the user does not match the received biometric measurements, then a user verification result indicating the user is not verified is returned (block 1212). The user verification result is returned, for example, to the access control system from which the user verification request was received.

FIG. 13 depicts a procedure 1300 in an example implementation in which continuously monitored biometric information is used to verify a user. Procedure 1300 is performed, for example, by an access control system, such as the access control system 112.

A request is received from a user of a computing device to access a protected system (block 1302). The protected system can be a system that stores data, performs transactions, allows physical access to a location (e.g., unlocks doors or disables security alarms), and so forth.

A request for authentication data for the user is communicated to the computing device (block 1304). Any of various authentication data can be requested as discussed above.

The authentication data is received from the computing device and includes an identifier of the user and a biometric measurement specified by the user at the computing device (block 1306). The biometric measurement is specified by the user, for example, by the user manually inputting the biometric measurement to a prompt displayed at the computing device.

A user verification request is communicated to a biometric measurement verification system (block 1308). The user verification request includes the identifier of the user and the biometric measurement specified by the user, as received in block 1306.

A user verification result is received from the biometric measurement verification system that indicates whether the user is verified (block 1310). The user verification result is determined based on whether the biometric measurement specified by the user matches multiple biometric measurements continuously received by the biometric measurement verification system from the computing device.

A check is made whether the user verification result indicates that the user is verified (block 1312). If the verification result indicates that the user is verified, then a user authenticated indication for the user is communicated to the protected system (block 1312). In one or more implementations the user authenticated indication is communicated to the protected system in block 1312 only if one or more other factors (e.g., a password or PIN of the user) are also verified by the access control system. However, if the verification result indicates that the user is not verified, then a user not authenticated indication for the user is communicated to the protected system (block 1314). The user not authenticated indication can be provided to the protected system regardless of whether any other factors are verified by the access control system.

FIG. 14 depicts a procedure 1400 in an example implementation in which user data associated with two user identifiers is combined and associated with a single user identifier. Procedure 1400 is performed, for example, by biometric information monitoring platform, such as biometric information monitoring platform 110.

Individual biometric measurements associated with a first user identifier are continuously received for a first user (block 1402). This results in a first set of multiple biometric measurements associated with the first user identifier. Optionally, activity data associated with the first user identifier is also continuously received in block 1402.

Individual biometric measurements associated with a second user identifier are also continuously received for a second user (block 1404). This results in a second set of multiple biometric measurements associated with the second user identifier. Optionally, activity data associated with the second user identifier is also continuously received in block 1404.

A determination is made whether the first user and the second user are the same user (block 1406). This determination is made by analyzing the first set of multiple biometric measurements and the second set of multiple biometric measurements, and optionally analyzing the activity data associated with the first user identifier and the activity data associated with the second user identifier.

In response to determining that the first user and the second user are the same user, the first set of biometric measurements and the second set of biometric measurements are combined (block 1408). The activity data associated with the first user identifier and the activity data associated with the second user identifier are also optionally combined. This results in a single user identifier being associated with both the first set of multiple biometric measurements and the second set of multiple biometric measurements, as well as optionally the activity data previously associated with the first user identifier and the activity data associated with the second user identifier.

However, in response to determining that the first user and the second user are not the same user, the first set of biometric measurements and the second set of biometric measurements are not combined (block 1410). Rather, the first set of biometric measurements (and optionally activity data associated with first user identifier) remain associated with the first user identifier, and the second set of biometric measurements (and optionally activity data associated with second user identifier) remain associated with the second user identifier.

Figure 15:
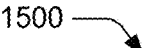
FIG. 15 depicts a procedure in an example implementation in which a security key is generated based on biometric measurements.

FIG. 15 depicts a procedure 1500 in an example implementation in which a security key is generated based on biometric measurements. Procedure 1500 is performed, for example, by a sensor module or a computing device, such as sensor module 206 or computing device 106.

Individual biometric measurements of a user of a wearable biometric information device worn by the user are continuously acquired (block 1502). This results in a set of multiple biometric measurements associated with the user. This continuously acquiring refers to, for example, a wearable biometric information monitoring device continuously generating the individual biometric measurements or a computing device continuously receiving the individual biometric measurements from the wearable biometric information monitoring device.

A security key is generated by applying one or more functions based on the biometric measurements (block 1504). These one or more functions include, for example, a hash function. The security key can be generated from a single individual biometric measurement or multiple ones of the individual biometric measurements.

The security key is used in communicating the biometric measurements to an additional device (block 1506). The security key can be used in a variety of different manners, such as a connection key to identify a connection between the wearable biometric information device and a computing device of the user or as a certification value of the biometric measurements to allow a biometric information monitoring platform to validate or verify the biometric measurements.

FIG. 16 depicts a procedure 1600 in an example implementation in which protected biometric measurements are verified for use by another computing device. Procedure 1600 is performed at least in part, for example, by a computing device, such as computing device 106.

Individual biometric measurements of a user of a first computing device are continuously received (block 1602). This results in a set of multiple biometric measurements associated with the user identifier. The biometric measurements are received from, for example, a wearable biometric information device worn by the user.

A biometric measurement of the set of glucose measurements is protected so as to be retrievable only by a recipient associated with an additional computing device (block 1604). The biometric measurement is protected, for example, by encrypting the biometric measurement with a public key of a public/private key pair associated with the recipient.

The protected biometric measurement is communicated to a set of computing devices to verify the protected biometric measurement for use by the additional computing device (block 1606). This communication includes, for example, a request for the set of computing devices to approve adding a block describing the protected biometric measurement and the recipient to a blockchain.

In response to the set of computing devices verifying the protected biometric measurement for use by the additional computing device, the additional computing device is allowed to use the protected biometric measurement (block 1608).

Example System and Device

Figure 17:
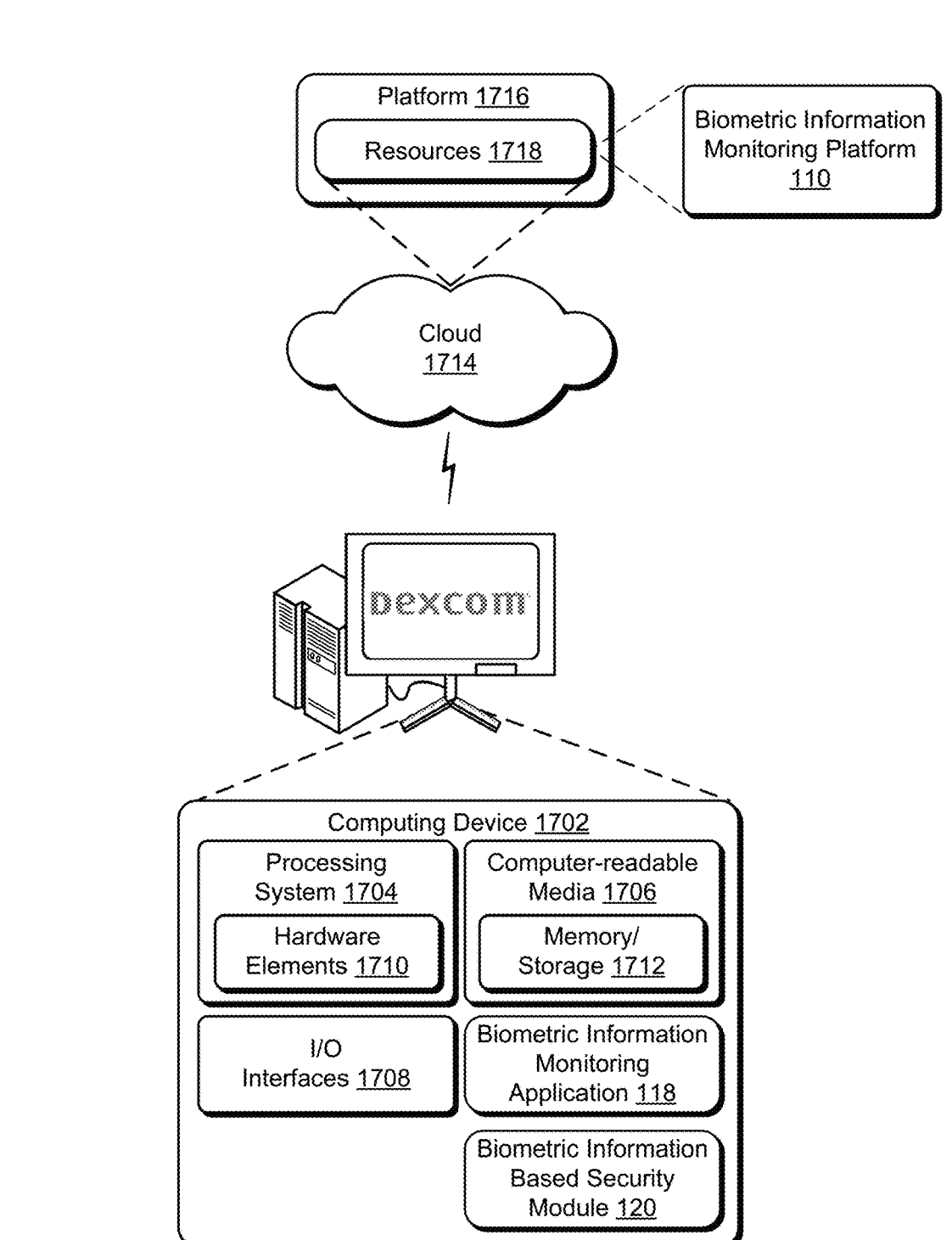
FIG. 17 illustrates an example of a system including various components of an example device that can be implemented as any type of computing device as described and/or utilized with reference to FIGS. 1-16 to implement embodiments of the techniques described herein.

FIG. 17 illustrates an example of a system generally at 1700 that includes an example of a computing device 1702 that is representative of one or more computing systems and/or devices that may implement the various techniques described herein. This is illustrated through inclusion of the biometric information monitoring application 118, the biometric information based security module 120, and the biometric information monitoring platform 110. The computing device 1702 may be, for example, a server of a service provider, a device associated with a client (e.g., a client device), an on-chip system, and/or any other suitable computing device or computing system.

The example computing device 1702 as illustrated includes a processing system 1704, one or more computer-readable media 1706, and one or more I/O interfaces 1708 that are communicatively coupled, one to another. Although not shown, the computing device 1702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including hardware elements 1710 that may be configured as processors, functional blocks, and so forth. This may include implementation in hardware as an application specific integrated circuit or other logic device formed using one or more semiconductors. The hardware elements 1710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1706 is illustrated as including memory/storage 1712. The memory/storage 1712 represents memory/storage capacity associated with one or more computer-readable media. The memory/storage component 1712 may include volatile media (such as random access memory (RAM)) and/or nonvolatile media (such as read only memory (ROM), Flash memory, optical disks, magnetic disks, and so forth). The memory/storage component 1712 may include fixed media (e.g., RAM, ROM, a fixed hard drive, and so on) as well as removable media (e.g., Flash memory, a removable hard drive, an optical disc, and so forth). The computer-readable media 1706 may be configured in a variety of other ways as further described below.

Input/output interface(s) 1708 are representative of functionality to allow a user to enter commands and information to computing device 1702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1702. By way of example, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, communication media include wired media such as a wired network or direct-wired connection, and wireless media such as acoustic, RF, infrared, and other wireless media.

As previously described, hardware elements 1710 and computer-readable media 1706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1710. The computing device 1702 may be configured to implement particular instructions and/or functions corresponding to the software and/or hardware modules. Accordingly, implementation of a module that is executable by the computing device 1702 as software may be achieved at least partially in hardware, e.g., through use of computer-readable storage media and/or hardware elements 1710 of the processing system 1704. The instructions and/or functions may be executable/operable by one or more articles of manufacture (for example, one or more computing devices 1702 and/or processing systems 1704) to implement techniques, modules, and examples described herein.

The techniques described herein may be supported by various configurations of the computing device 1702 and are not limited to the specific examples of the techniques described herein. This functionality may also be implemented all or in part through use of a distributed system, such as over a "cloud" 1714 via a platform 1716 as described below.

The cloud 1714 includes and/or is representative of a platform 1716 for resources 1718. The platform 1716 abstracts underlying functionality of hardware (e.g., servers) and software resources of the cloud 1714. The resources 1718 may include applications and/or data that can be utilized while computer processing is executed on servers that are remote from the computing device 1702. Resources 1718 can also include services provided over the Internet and/or through a subscriber network, such as a cellular or Wi-Fi network.

The platform 1716 may abstract resources and functions to connect the computing device 1702 with other computing devices. The platform 1716 may also serve to abstract scaling of resources to provide a corresponding level of scale to encountered demand for the resources 1718 that are implemented via the platform 1716. Accordingly, in an interconnected device embodiment, implementation of functionality described herein may be distributed throughout the system 1700. For example, the functionality may be implemented in part on the computing device 1702 as well as via the platform 1716 that abstracts the functionality of the cloud 1714.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method performed by a computing device, the method comprising:
receiving, by the computing device via a continuous analyte sensor, a signal indicative of individual biometric measurements of a user, resulting in a set of multiple biometric measurements of the user, the multiple biometric measurements including multiple glucose measurements;
associating the multiple biometric measurements with an identifier of the user;
displaying, on the computing device and to the user, a current glucose measurement included in the multiple biometric measurements of the user;
receiving, by the computing device as manual input from the user, the current glucose measurement, the manual input being entered by the user after visually observing the current glucose measurement displayed by the computing device;
receiving, by the computing device from a remote access control system that is separate from and lacks a direct data link to the computing device, a user verification request that includes the current glucose measurement manually entered by the user and the identifier of the user;
checking, by the computing device, whether the current glucose measurement manually entered by the user matches a most recently received biometric measurement associated with the identifier of the user and received from the computing device; and
returning, by the computing device to the remote access control system, a user verification result based on the checking, the user verification result indicating the user is verified in response to the current glucose measurement manually entered by the user matching the most recently received biometric measurement or indicating the user is not verified in response to the current glucose measurement manually entered by the user not matching the most recently received biometric measurement, the user verification result enabling the user to access a protected system or restricting the user from accessing the protected system.

2. The method of claim 1, the checking including checking whether the current glucose measurement manually entered by the user is an exact match to a most recently received biometric measurement of the multiple biometric measurements.

3. The method of claim 1, further comprising:

determining, by the computing device, that the most recently received biometric measurement was received more than a threshold amount of time before a current time, the user verification result indicating the user is not verified in response to determining that the most recently received biometric measurement was received more than the threshold amount of time before the current time.

4. The method of claim 3, the user verification result further indicating that the user is not verified due to insufficient biometric measurements to verify the user.

* * * * *